US011991607B2

(12) United States Patent
Bharadwaj et al.

(10) Patent No.: US 11,991,607 B2
(45) Date of Patent: *May 21, 2024

(54) RESOURCE ALLOCATION AND SEGMENTATION IN WIRELESS SYSTEMS

(71) Applicant: QUALCOMM Incorporated, San Diego, CA (US)

(72) Inventors: Arjun Bharadwaj, Cupertino, CA (US); Tien Viet Nguyen, Bridgewater, NJ (US); Kapil Gulati, Belle Mead, NJ (US); Sudhir Kumar Baghel, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,533

(22) Filed: Dec. 27, 2022

(65) Prior Publication Data

US 2023/0217221 A1    Jul. 6, 2023

Related U.S. Application Data

(63) Continuation of application No. 16/738,970, filed on Jan. 9, 2020, now Pat. No. 11,570,593.

(Continued)

(51) Int. Cl.
*H04W 4/44* (2018.01)
*H04W 72/04* (2023.01)

(52) U.S. Cl.
CPC ............. *H04W 4/44* (2018.02); *H04W 72/04* (2013.01)

(58) Field of Classification Search
CPC ... H04L 9/34; H04L 12/22; H04L 5/00; H04L 1/0057; H04W 24/08; H04W 4/44; H04W 4/46

See application file for complete search history.

(56) References Cited

U.S. PATENT DOCUMENTS 10,608,809 B2    3/2020  Haartsen
11,570,593 B2 *  1/2023  Bharadwaj .............. H04W 4/44
(Continued)

FOREIGN PATENT DOCUMENTS

CN    107295459 A    10/2017
CN    107683613 A    2/2018
(Continued)

OTHER PUBLICATIONS

ERICSSON: "On Mode 2 Resource Allocation for NR Sidelink," 3GPP Draft, 3GPP TSG-RAN WG1 Meeting #95, R1-1813641, ERICSSON—On Mode 2 Resource Allocation for NR Side Link, 3rd Generation Partnership Project (3GPP), Mobile Competence Centre, 650, Route Des Lucioles, F-06921, Sophia-Antipolis Cedex, France, vol. RAN WG1, No. Spokane, WA, US, Nov. 12, 2018-Nov. 16, 2018, Nov. 11, 2018 (Nov. 11, 2018), XP051555699, 15 pages, section 5.3, the Whole Document.

(Continued)

*Primary Examiner* — Khalid W Shaheed
(74) *Attorney, Agent, or Firm* — Holland & Hart LLP

(57) ABSTRACT

Methods, systems, and devices for wireless communications are described that may enable a user equipment (UE) to transmit sidelink data within an interference avoidance resource scheduling scheme. For example, a UE may determine to segment a data packet for transmission in a vehicle-to-everything (V2x) system (e.g., to ensure that each segment fits within one transmission time interval (TTI)). In some cases, a UE may identify a data packet for transmission, may determine that the size of the data packet exceeds a threshold size, may segment the data packet to ensure each segment fits within one TTI, and may transmit the data packet segments (e.g., to additional UEs), where said transmissions may be discontinuous. In some examples, a UE may determine to segment the data packet and then encode (Continued)

the data packet. Additionally or alternatively, the UE may determine to encode the data packet and then segment the data packet.

30 Claims, 13 Drawing Sheets

Related U.S. Application Data

(60) Provisional application No. 62/790,929, filed on Jan. 10, 2019.

(56) References Cited

U.S. PATENT DOCUMENTS

| | | | |
|---|---|---|---|
| 2017/0290033 | A1 | 10/2017 | Blasco Serrano et al. |
| 2018/0146398 | A1 | 5/2018 | Kim et al. |
| 2018/0206246 | A1* | 7/2018 | Zhang .................. H04L 1/1896 |
| 2018/0220280 | A1 | 8/2018 | Baghel |
| 2019/0149274 | A1 | 5/2019 | Freda et al. |
| 2020/0053768 | A1 | 2/2020 | Chen et al. |
| 2020/0146082 | A1 | 5/2020 | Chen et al. |
| 2020/0228949 | A1 | 7/2020 | Bharadwaj |

FOREIGN PATENT DOCUMENTS

| | | |
|---|---|---|
| CN | 108282248 A | 7/2018 |
| WO | WO-2016164670 A1 | 10/2016 |

OTHER PUBLICATIONS

Intel Corporation: "Resource Allocation Schemes for NR V2X Sidelink Communication", 3GPP Draft, 3GPP TSG RAN WG1 Meeting #95, R1-1812491, Intel—EV2X_SL_RA, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051554435, 15 pages, section 5.1, Proposal 5, 2.1 UE Autonomous Resourceselection—Mode 2(a).

International Preliminary Report on Patentability—PCT/US2020/013228 The International Bureau of WIPO—Geneva, Switzerland, Jul. 22, 2021.

International Search Report and Written Opinion—PCT/US2020/013228—ISA/EPO—Mar. 27, 2020.

Qualcomm Incorporated: "Sidelink Resource Allocation Mechanism for NR V2X", 3GPP Draft, 3GPP TSG RAN WG1 Meeting #95, R1-1813424, Sidelink Resource Allocation Mechanism for NR V2X, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051555463, 9 pages, section 4.

* cited by examiner

RESOURCE ALLOCATION AND SEGMENTATION IN WIRELESS SYSTEMS

CROSS REFERENCE

The present Application for Patent is a Continuation of U.S. patent application Ser. No. 16/738,970 by BHARADWAJ et al., entitled "RESOURCE ALLOCATION AND SEGEMENTATION IN WIRELESS SYSTEMS" filed Jan. 9, 2020, which claims the benefit of U.S. Provisional Patent Application No. 62/790,929 by BHARADWAJ et al., entitled "RESOURCE ALLOCATION AND SEGMENTATION IN WIRELESS SYSTEMS," filed Jan. 10, 2019, assigned to the assignee hereof, and expressly incorporated herein.

BACKGROUND

The following relates generally to wireless communications, and more specifically to resource allocation and segmentation in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may include or support networks used for direct communications between wireless devices, e.g., direct communications between UEs. Examples of direct communications include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, and the like.

In a sidelink communications system (e.g., a V2X system), a UE (e.g., a vehicle) may transmit data to, and receive data from, other UEs using sidelink communications channels (e.g., time-frequency resources allocated for sidelink communications). For example, a UE within a V2X system may transmit sidelink data to inform other UEs about a state of a vehicle or may transmit data to assist vehicles with certain tasks (e.g., autonomous driving). In some cases, a UE in a V2X system may maintain accurate system information by attempting to receive data packets from each neighboring UE. In some V2X systems, a UE may operate according to a half-duplex mode when transmitting and/or receiving data, where the UE may be unable to transmit and receive data during the same time period. Efficient methods for allocating resources in a sidelink or V2X system are desired.

SUMMARY

The described techniques relate to improved methods, systems, devices, and apparatuses that support resource allocation and segmentation in wireless systems. Generally, the described techniques provide for enabling a user equipment (UE) (e.g., a vehicle) to transmit sidelink data within an interference avoidance resource scheduling scheme. For example, a UE may determine to segment a data packet for transmission in a vehicle-to-everything (V2X) system (e.g., to ensure that each data packet segment fits within one transmission time interval (TTI)) or other systems such as vehicle-to-vehicle (V2V) networks, cellular V2X (C-V2X) networks, and the like. In some cases, a UE may identify a data packet for transmission, segment the data packet to ensure that each segment fits within one TTI, and transmit one or more data packet segments to one or more wireless devices (e.g., to additional UEs). In some examples, a data packet segment (e.g., an initial data packet segment) may include information indicating resources reserved for subsequent data packet segments corresponding to the original data packet. Additionally or alternatively, a data packet segment may also indicate resources reserved for its own retransmission.

According to some aspects, a UE may determine that a data packet exceeds a threshold size and determine to segment the data packet. In one example, the UE may segment the data packet such that each of the resulting segments corresponds to a single code block. The UE may then encode the data packet segments after segmentation. In some cases, a UE may accomplish the segmentation and encoding by segmenting a radio link control (RLC) protocol data unit (PDU) into a set of medium access control (MAC) PDUs, and encode the MAC PDUs for transmission. In an additional example, the UE may segment the data packet based on a number of coded bits for a single TTI, where the encoding may take place before the segmentation. For example, the UE may encode a MAC PDU into a buffer and map encoded bits from the buffer to resources within a single TTI to create a data packet segment, after which the UE may transmit the data packet segment.

A method of wireless communications is described. The method may include determining, by a first wireless device in a V2X system, a data packet for transmission to at least one other wireless device in the V2X system, determining a set of data packet segments of the data packet, each data packet segment corresponding to a single TTI for transmission to the at least one other wireless device, and transmitting the set of data packet segments to the at least one other wireless device via each TTI corresponding to the set of data packet segments, where a data packet segment transmission indicates resources for at least one of a retransmission of the data packet segment or subsequent data packet segment transmissions.

An apparatus for wireless communications is described. The apparatus may include a processor, memory in electronic communication with the processor, and instructions stored in the memory. The instructions may be executable by the processor to cause the apparatus to determine, by a first wireless device in a V2X system, a data packet for transmission to at least one other wireless device in the V2X system, determine a set of data packet segments of the data packet, each data packet segment corresponding to a single TTI for transmission to the at least one other wireless device, and transmit the set of data packet segments to the at least one other wireless device via each TTI corresponding to the set of data packet segments, where a data packet segment transmission indicates resources for at least one of a retransmission of the data packet segment or subsequent data packet segment transmissions.

Another apparatus for wireless communications is described. The apparatus may include means for determining, by a first wireless device in a V2X system, a data packet for transmission to at least one other wireless device in the V2X system, determining a set of data packet segments of the data packet, each data packet segment corresponding to a single TTI for transmission to the at least one other wireless device, and transmitting the set of data packet segments to the at least one other wireless device via each TTI corresponding to the set of data packet segments, where a data packet segment transmission indicates resources for at least one of a retransmission of the data packet segment or subsequent data packet segment transmissions.

A non-transitory computer-readable medium storing code for wireless communications is described. The code may include instructions executable by a processor to determine, by a first wireless device in a V2X system, a data packet for transmission to at least one other wireless device in the V2X system, determine a set of data packet segments of the data packet, each data packet segment corresponding to a single TTI for transmission to the at least one other wireless device, and transmit the set of data packet segments to the at least one other wireless device via each TTI corresponding to the set of data packet segments, where a data packet segment transmission indicates resources for at least one of a retransmission of the data packet segment or subsequent data packet segment transmissions.

DETAILED DESCRIPTION

Figure 1:
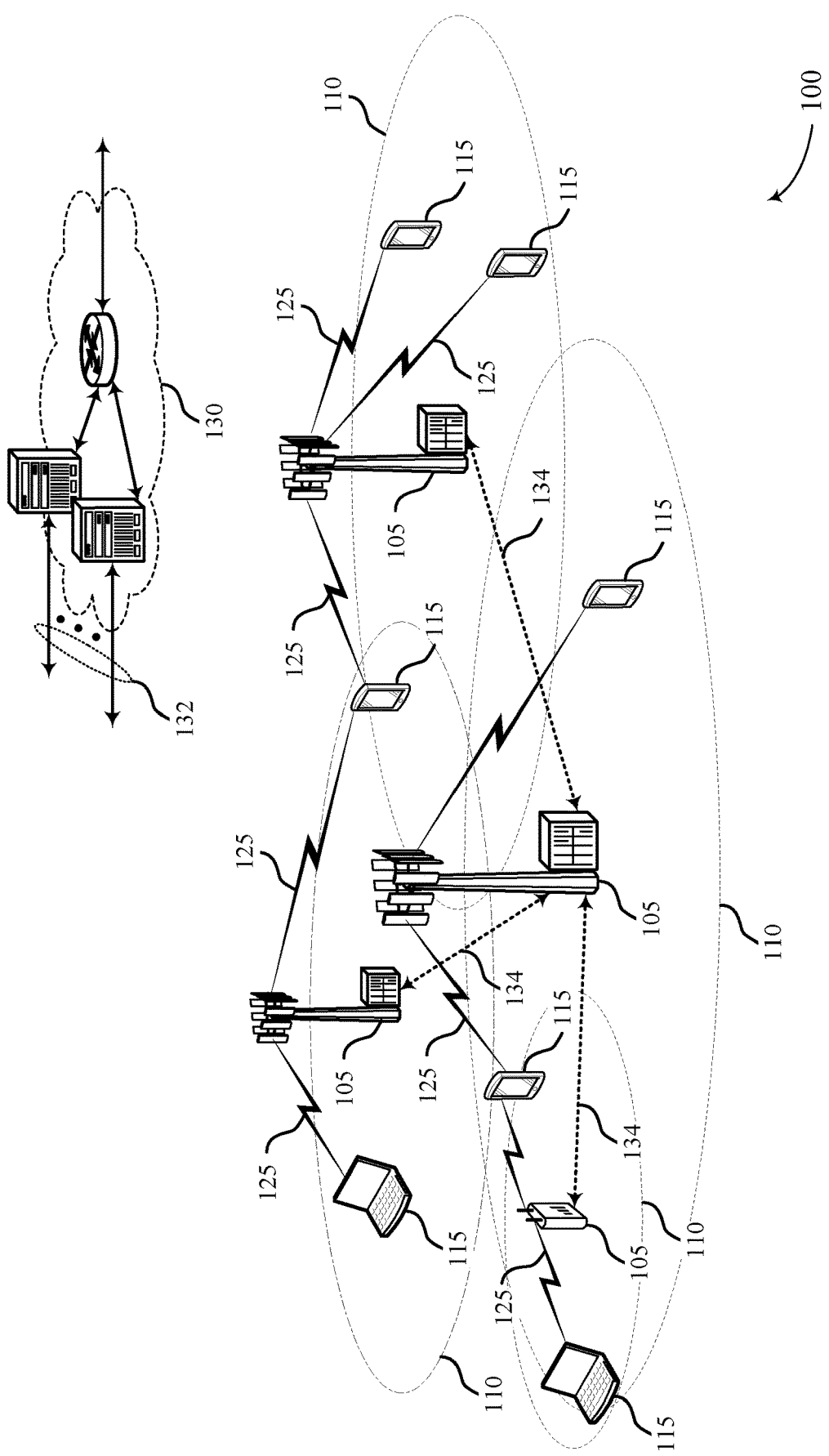
FIG. 1 illustrates an example of a wireless communications system that supports resource allocation and segmentation in wireless systems in accordance with aspects of the present disclosure.

Wireless communications devices operating in a sidelink communications system (e.g., vehicle-to-everything (V2X) system, a vehicle-to-vehicle (V2V) system, a cellular V2X (C-V2X) system) may communicate with each other using the same frequency band. For example, a user equipment (UE) within a V2X system may attempt to receive communications from each neighboring UE in order to maintain accurate system information (e.g., to receive data for autonomous driving applications). Additionally, a UE in a V2X system may operate according to a half-duplex mode during reception and/or transmission of data, where the UE may be unable to concurrently transmit and receive data. As such, a V2X system may employ a dynamic resource scheduling scheme to utilize available frequency resources and meet scheduling constraints imposed by half duplexing.

For example, a UE within a V2X system may decode control channel transmissions from other UEs within the system in order to obtain information regarding the resources occupied by each respective UE. In some cases, a UE may maintain a resource map containing information regarding occupied resources, and may use this map to select resources for its own transmissions. In some examples, a UE may randomly select resources based on a hierarchy of rules and the resource map. For instance, a UE may select transmission resources that do not coincide with a transmission time interval (TTI) selected by any other UE. If such resources are not available, the UE may select resources that coincide in time with a retransmission of data by another UE (e.g., instead of an initial transmission of data), may select resources that belong to a UE that is sufficiently far away (e.g., based on measurement(s) of received signal(s) from other UEs) from the transmitting UE, may select resources that are unoccupied but coincide in time with another transmission, or may select resources that are occupied by a transmission of a lower priority.

In some cases, a UE may transmit data using a dynamic resource scheduling scheme that may include segmenting data for transmission within single TTIs. As such, the UE may be able to select discontinuous transmission resources, which may allow the UE to choose resources which may not be available for transmission using aggregated TTIs. In some examples, a UE may determine that a data packet is unable to fit within one TTI (e.g., based on the data packet size) and may therefore determine to segment the data packet for transmission (e.g., to ensure each segment fits within one TTI). Additionally or alternatively, a UE may determine to segment a data packet due to additional time diversity gains available from segmenting a data packet and sending the segments as discontinuous transmissions.

In some cases, the UE may determine to segment the data packet before encoding the packet for transmission, and each segment may therefore correspond to a single code block. For example, the UE may segment a radio link control (RLC) protocol data unit (PDU) into medium access control (MAC) PDUs that the UE has determined may each fit within one TTI. In other cases, the UE may determine to segment the data packet after encoding so that each data segment may correspond to the required number of coded bits for transmission in a single TTI. For example, the UE may encode MAC PDUs into a buffer and read bits out of the buffer and into one TTI (e.g., one transmission resource) at a time, where the UE may transmit the TTI after reading in a required amount of data. In some examples of segmented data packets, each segment may indicate (e.g., within a control channel or data channel) resources for its own retransmission. Additionally, a first data segment may also indicate (e.g., within a control channel or data channel) any resource reservations for subsequent segments belonging to the same data packet.

Particular aspects of the subject matter described herein may be implemented to realize one or more advantages. The described techniques may support improvements in system efficiency such that a UE may avoid inefficiently using resources that are occupied by another UE and instead use a candidate resource that may be unoccupied or that satisfy the hierarchy (e.g., based on a priority of the data packet and/or other data packets from other devices). In some examples, a data packet may not fit completely within some candidate resources. The described techniques may support segmenting the data packet such that the UE may efficiently use such candidate resources by segmenting and transmitting the data packet in smaller segments. In this way, the UE may transmit data packet segments in a greater number of candidate resources, potentially reducing latency compared to a UE that waits to transmit the data packet until the UE identifies a candidate resource that may completely fit the data packet. Therefore, the described techniques may allow for greater transmission flexibility at the UE and more efficiently use available resources. As such, supported techniques may include improved network operations and, in some examples, may promote device and network efficiencies, among other benefits.

Aspects of the disclosure are initially described in the context of wireless communications systems. Aspects of the disclosure are further illustrated by and described with reference to segmentation schemes, a process flow, apparatus diagrams, system diagrams, and flowcharts that relate to resource allocation and segmentation in wireless systems.

FIG. 1 illustrates an example of a wireless communications system 100 that supports resource allocation and segmentation in wireless systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. An RLC layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In a V2X communications system, sidelink transmissions 135 between UEs 115 may occur within the same frequency band. In some cases, UEs 115 within a V2X system may transmit sidelink data to inform and assist vehicles within a certain vicinity (e.g., for autonomous driving applications). In some examples, sidelink data transmissions 135 may include information such as vehicle intentions (e.g., if a vehicle is to increase or decrease speed) or context notifications (e.g., if a vehicle is an emergency or police vehicle), as well as information regarding the current state of the vehicle (e.g., current speed and/or location). In some V2X systems, a UE 115 may experience a half-duplex effect, where the UE 115 may be unable to transmit and receive data during the same time period. Moreover, each UE 115 may, in order to maintain accurate system information, both transmit its own data and attempt to receive each data packet from each neighboring UE 115. As such, a UE 115 may employ various resource scheduling schemes to avoid collisions with sidelink transmissions from other UEs 115.

In some cases, a UE 115 may use a semi-persistent scheduling scheme for transmitting V2X communications, where communication resources may be defined by a certain periodicity (e.g., 20 ms, 50 ms, 100 ms, etc.). Additionally or alternatively, a UE 115 may employ aperiodic resource scheduling and may additionally vary data packet sizes with each transmission. For example, a UE 115 may use a dynamic resource reservation scheme to utilize available resources and thereby ensure performance metrics are met (e.g., latency requirements). In some cases, the frequency allocation size may be limited to ensure a UE 115 meets a link budget. For example, a receiving device may receive a higher amount of energy per bit of data if a transmitting device transmits using multiple time slots (e.g., continuous or discontinuous slots) for transmission instead of using multiple frequency resources.

In one example, of a dynamic resource scheduling scheme, a UE 115 may determine which resources are occupied by surrounding UEs 115, may randomly select resources based on an interference avoidance scheme, and may transmit using the selected resources. In some cases, a UE 115 may transmit sidelink data without aggregating the data across multiple TTIs (e.g., data may be segmented into separate TTIs). For example, a UE 115 may employ a segmentation scheme to ensure that sidelink data segments each fit within one TTI. In some cases, data transmitted in this manner may be discontinuous and may allow a UE 115 to choose resources which may not be available for transmission using aggregated TTIs.

Figure 2:
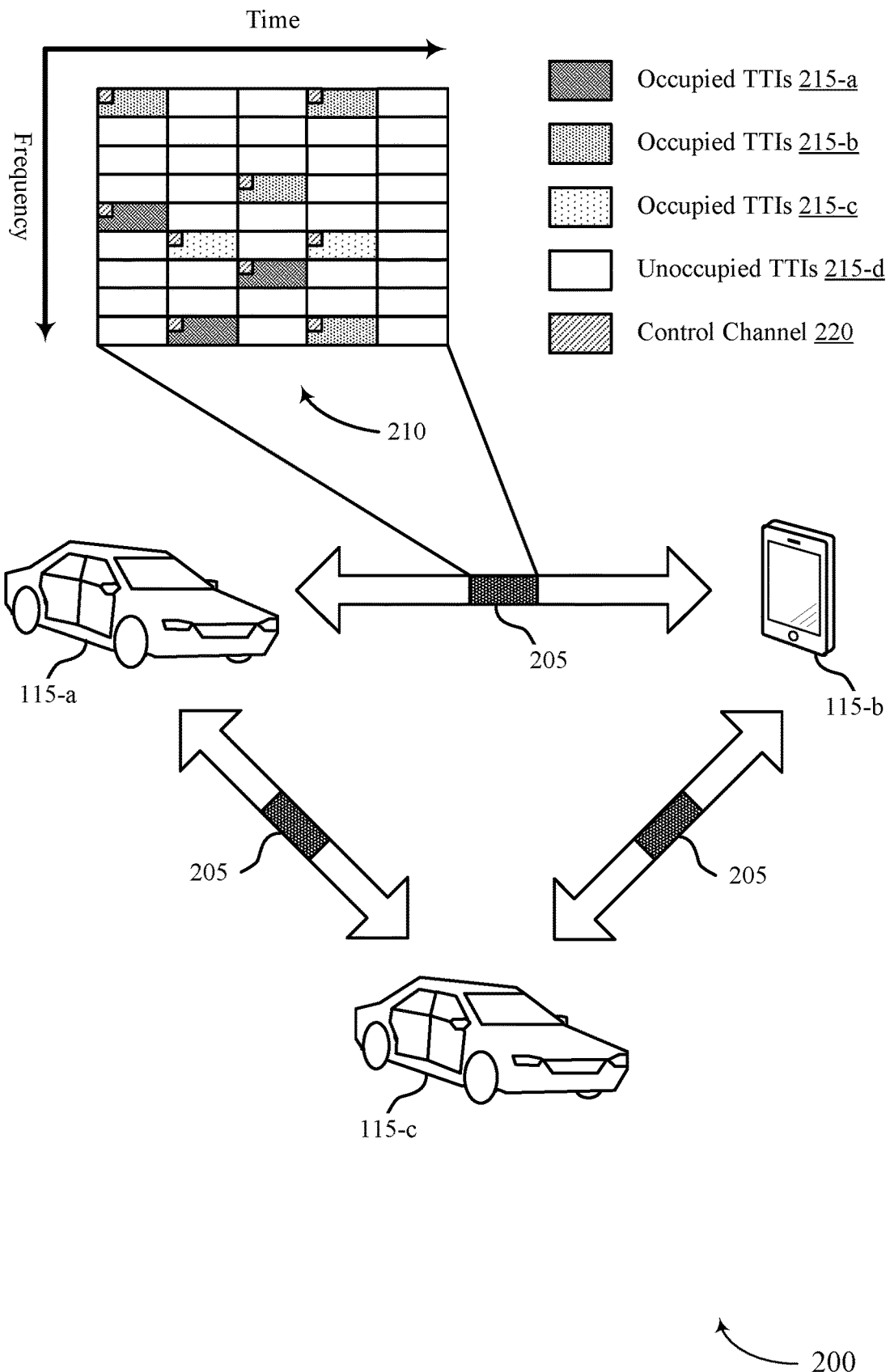
FIG. 2 illustrates an example of a wireless communications system that supports resource allocation and segmentation in wireless systems in accordance with aspects of the present disclosure.

FIG. 2 illustrates an example of a wireless communications system 200 that supports resource allocation and segmentation in wireless systems in accordance with aspects of the present disclosure. In some examples, wireless communications system 200 may implement aspects of wireless communications system 100 and may include UEs 115-*a*, 115-*b*, and 115-*c*, which may be examples of UE 115 described with reference to FIG. 1. In some cases, UEs 115-*a*, 115-*b*, and 115-*c* may communicate with each other within a V2X system (e.g., using sidelink communications 205) and may employ a resource scheduling interference avoidance scheme to dynamically select and use transmission resources.

According to some aspects, UE 115-*a* may attempt to decode sidelink transmissions 205 from UEs 115-*b* and 115-*c* in order to maintain accurate system information (vehicle data, scheduled resources, etc.) and construct a resource map 210. In some cases, sidelink transmissions 205 may include a control channel 220, which UE 115-*a* may decode to determine which resources within the V2X frequency band are reserved or occupied by UEs 115-*b* and 115-*c*, respectively. In some examples, transmissions on a control channel 220 may indicate a length of a transmission (e.g., initial transmission length and/or total transmission length), which may, in some cases, remain the same for any subsequent transmission (e.g., retransmission). Additionally, UE 115-*a* may use current and previous reservation information to construct a resource map 210, which may indicate resources (e.g., TTIs 215-*a*, 215-*b*, and 215-*c*) that are occupied by UEs 115-*a*, 115-*b*, and 115-*c*, respectively, and may also indicate unoccupied resources (e.g., unoccupied TTIs 215-*d*). In some cases, UE 115-*a* may use resource map 210 to select resources (e.g., one or more TTIs 215) to use for its own sidelink transmissions 205, which may also be selected based on an interference avoidance scheme.

Transmissions on a control channel 220 from UE 115-*a* may include a reservation indication to reserve resources for future transmissions. In some cases, a first resource reservation for a data packet may indicate resources to be used for a following transmission, such as a retransmission and/or a transmission of subsequent data corresponding to the same data packet and in some examples, a resource reservation subsequent to the first resource reservation for a data packet may only indicate resources reserved for retransmissions. In some cases, UE 115-*a* may indicate resource reservations using a slot index and a subchannel index. The slot index may include a defined number of bits (e.g., six bits), a subchannel index may include a different defined number of bits (e.g., four bits), and the overall reservation indication may contain a total of the slot index bits and subchannel index bits (e.g., 10 bits). In some examples, the slot index may indicate a reservation for a slot (e.g., a TTI 215) corresponding to a specified number of slots following a control channel 220 of a transmission. Additionally or alternatively, the slot index may indicate a reservation for a slot (e.g., a TTI 215) corresponding to a specified number of slots following the last slot of the transmission. The subchannel index may indicate a reservation for a subchannel corresponding to a specified number of subchannels from the start or from the end of a subchannel resource pool. In some cases, the subchannel may be defined as a given amount (e.g., a minimum or a maximum) of a frequency spectrum that a transmission resource (e.g., TTI 215) may occupy.

UE 115-*a* may begin selecting transmission resources by defining a window for resource selection within the V2X transmission resources (e.g., using resource map 210). For example, UE 115-*a* may define a window based on whether a transmission is an initial transmission or a retransmission, based on latency requirements of a data packet, or based on a soft-buffer requirement of UE 115-*a* (e.g., UE 115-*a* may only be able to store data for up to 16 ms). Within the defined window, UE 115-*a* may select one or more TTIs 215 for transmission by identifying one or more candidate TTIs 215. For example, UE 115-*a* may use resource map 210 to identify TTIs 215-*b* (e.g., resources occupied by UE 115-*b*) and TTIs 215-*c* (e.g., resources occupied by UE 115-*c*) and may determine to exclude these resources from selection based on the resources being occupied. Additionally or alternatively, UE 115-*a* may identify candidate TTIs 215 based on a distance between UE 115-*a* and either UE 115-*b* or 115-*c*. For example, if UE 115-*c* has reserved TTIs 215-*c*, but UE 115-*c* is beyond a threshold distance from UE 115-*a* (e.g., as indicated in a transmission on a control channel 220), UE 115-*a* may identify TTIs 215-*c* as candidate resources. In some cases, UE 115-*a* may also identify candidate TTIs 215 based on a latency requirement of a data packet to be sent. For example, UE 115-*a* may have a latency threshold requirement and may identify TTIs 215 that satisfy the requirement.

In some examples, UE 115-*a* may select resources based on a hierarchy of rules (e.g., an interference avoidance scheme) and candidate resources identified using resource map 210. In some cases, UE 115-*a* may first attempt to randomly select an unoccupied TTI 215-*d* that may not coincide in time with any other reserved TTI 215-*a*, 215-*b*, or 215-*c* (e.g., in order to avoid half duplex effects). For example, UE 115-*a* may select an unoccupied TTI 215-*d* from the last column (e.g., the right-most column) of resource map 210 or from another column that may include only unoccupied TTIs 215-*d*. Additionally or alternatively, an earlier unoccupied TTI 215-*d* may be preferred over a later unoccupied TTI 215-*d* (e.g., instead of the selection process being completely random). For example, in some cases, UE 115-*a* may select the earliest unoccupied TTI 215-*d* that does not coincide in time with another TTI 215-*d*.

In some cases, UE 115-*a* may be unable to transmit on or unable to find an unoccupied TTI 215-*d* that does not coincide in time with other transmissions. Therefore, UE 115-*a* may proceed to select unoccupied TTIs 215-*d* that may be multiplexed in frequency with retransmissions from UE 115-*b* or 115-*c*, where the retransmissions may correspond to original transmissions that UE 115-*a* may have successfully decoded. For example, UE 115-*a* may determine (e.g., from decoding a control channel 220) that TTIs 215-*b* and 215-*c* within the second-to-last column of resource map 210 are retransmissions, and may further determine that UE 115-*a* has already successfully decoded the original transmissions corresponding to the retransmissions. As such, UE 115-*a* may proceed to select an unoccupied TTI 215-*d* within the second-to-last column of resource map 210.

Additionally or alternatively, UE 115-*a* may be unable to transmit on or unable to find an unoccupied TTI 215-*d* after attempting the above techniques. Therefore, UE 115-*a* may determine to randomly select any unoccupied TTI 215-*d* of the appropriate size for its own transmissions. Additionally or alternatively, UE 115-*a* may determine to preempt resources of a lower priority, where the resource priority may be determined from decoding a control channel 220. For example, UE 115-*a* may determine to preempt one or more TTIs 215-*b* for its own transmissions and may indicate this intention in a control channel 220 associated with the transmissions. As such, UE 115-*b* may decode the control channel 220 transmitted by UE 115-*a* (e.g., as part of constructing a resource map 210), may determine that UE 115-*a* is preempting resources on one or more TTIs 215-*b*, and may release the preempted resources. In some cases, UE 115-*a* may identify lower priority resources for preemption based on a signal strength (e.g., a received signal strength indicator (RSSI) or a reference signal received power (RSRP)) of the transmissions corresponding to the resources. For example, UE 115-*a* may identify transmissions with a lower signal strength as lower priority (e.g., because the low signal strength may indicate the transmitting device may be located beyond a certain distance from UE 115-*a*).

In some cases, lower priority TTIs 215-*b* or 215-*c* may not be available for UE 115-*a* to preempt (e.g., within the determined window) and therefore UE 115-*a* may revise the distance metric used to identify candidate resources. For example, as UE 115-*a* decodes transmissions on control channels 220 from UEs 115-*b* and 115-*c* (e.g., as a part of constructing resource map 210), UE 115-*a* may determine that either UE 115-*b* or 115-*c* is transmitting from beyond a specified distance (e.g., beyond the revised distance metric). As such, UE 115-*a* may determine to include candidate resources transmitted from beyond the revised distance metric when selecting resources. Additionally or alternatively, UE 115-*a* may relax a criteria for candidate resources such as a signal strength (e.g., an RSSI or an RSRP), such that UE 115-*a* may consider occupied TTIs 215-*b* or 215-*c* with a signal strength below a certain threshold (e.g., which may indicate a transmission location beyond a certain distance from UE 115-*a*) as a candidate resource for transmitting data. In some cases, UE 115-*a* may extend its window for resource selection (e.g., using a configuration for UE 115-*a*) based on whether soft-buffer bits may be available or based on latency constraints (e.g., latency constraints may not be rigid). After adjusting one or more criteria (e.g., distance metric, signal strength, window size), UE 115-*a* may determine to repeat the steps described herein for resource selection using an interference avoidance scheme.

In some cases, TTIs 215-*a*, 215-*b*, and 215-*c* may contain resources dedicated to HARQ feedback, which all other UEs 115 may decode as part of constructing a resource map 210.

In some examples, a transmitting UE 115-*a* may not receive any negative acknowledgement (NAK) feedback from either UE 115-*b* or 115-*c* regarding a sidelink transmission 205 (e.g., corresponding to one or more TTIs 215-*a*) and may therefore determine to release any TTIs 215-*a* reserved for retransmission. As such, UE 115-*a* may indicate (e.g., via a control channel 220) that it has released the retransmission resources and UEs 115-*b* and 115-*c* may update their respective resource maps 210 accordingly. Additionally or alternatively, UE 115-*a* may receive a NAK corresponding to the sidelink transmission 205 and may therefore determine to continue retransmitting on any reserved retransmission resources (e.g., resource maps 210 may therefore remain unchanged). In some examples, UE 115-*a* may be unable to process a NAK (e.g., due to collisions or results of the half duplex constraint) and may therefore determine to continue to transmit on the resources reserved for retransmission. Additionally or alternatively, if UE 115-*a* is unable to process a NAK but determines that a received power level is below a given threshold (e.g., indicating that a UE 115 transmitting a NAK may be beyond a certain distance), UE 115-*a* may determine to release its retransmission resources. In some cases, the action to be taken by a UE 115 may be a part of the configuration of said UE 115 (e.g., based on UE capability).

In some examples of V2X communications system, UE 115-*a* may only select frequency resources (e.g., subchannels) on predefined subchannel indices, and may additionally only select frequency resources according to a priority (e.g., in order to minimize collisions among data packets employing FDM). For example, data packets within a 20 MHz band that occupy 10 MHz each may only have two subchannel indices from which to choose resources, and each 10 MHz subchannel may be assigned an equal priority. Additionally or alternatively, data packets within a 20 MHz band that occupy 5 MHz each may have four subchannel indices from which to choose resources. In this example, subchannels corresponding to 0 MHz and 10 MHz may have a highest priority for selection, while subchannels corresponding to 5 MHz and 15 MHz may have a secondary priority.

Additionally, UE 115-*a* may send sidelink transmissions 205 without aggregating data across multiple TTIs 215 (e.g., data may be segmented such that each segment may fit into a separate TTI 215). For example, UE 115-*a* may employ a segmentation scheme to ensure that segments for sidelink transmissions 205 each fit within one TTI 215. In some cases, data transmitted in this manner may be discontinuous and may allow UE 115-*a* to select resources which may not be available for transmission using aggregated TTIs 215.

Figure 3:
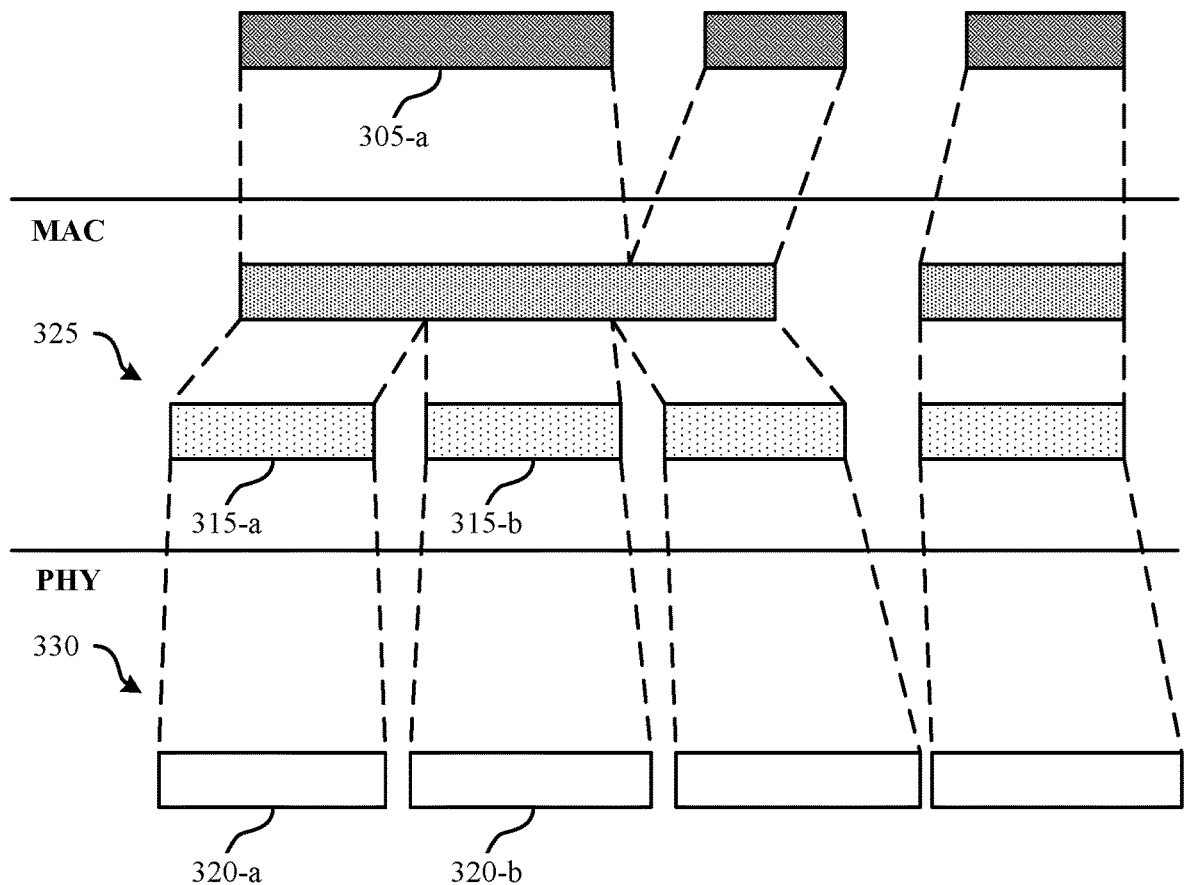
FIGS. 3 and 4 illustrate examples of segmentation processes that support resource allocation and segmentation in wireless systems in accordance with aspects of the present disclosure.

FIG. 3 illustrates an example of a segmentation process 300 that supports resource allocation and segmentation in wireless systems in accordance with aspects of the present disclosure. In some examples, segmentation process 300 may implement aspects of wireless communications systems 100 or 200. Segmentation process 300 may be implemented by a UE, such as a UE 115 described with reference to FIGS. 1 and 2.

As described herein with reference to FIG. 2, a UE 115 may segment data packets in order to ensure that each data packet fits within one TTI. In some cases, UE 115 may determine that a data packet may not fit within one TTI and may therefore determine to segment the data packet.

In some examples, UE 115 may create segments from a data packet where each segment may correspond to a single code block. For example, UE 115 may create data packet segments before encoding by creating segmented MAC PDUs 315. Additionally, UE 115 may segment the MAC PDUs 315 such that the resulting data packet segments 320 may each fit within one TTI. Following the creation of the MAC PDUs 315, UE 115 may encode the MAC PDUs 315 and then transmit the data packet segments 320.

For example, UE 115 may create data packets for V2X transmissions and may prepare the data packets for transmission. As part of the data preparation process, UE 115 may create RLC PDUs 305 corresponding to the data packets. In some cases, UE 115 may determine to segment the RLC PDUs 305 before passing them to the MAC layer as MAC service data units (SDUs) 310 (e.g., to ensure that each final data packet segment 320 fits within one TTI). In some examples, UE 115 may use MAC SDUs 310 to prepare MAC PDUs 315, where UE 115 may employ a segmentation process 320 to create MAC PDUs 315 (e.g., to ensure that each of the final data packet segments 320 fits within one TTI). In some cases, UE 115 may then encode MAC PDUs 315 using an encoding process 325, following which UE 115 may transmit the resulting data packet segments 320 using a Physical layer 330.

In some cases, the transmission of a data packet segment 320-*a* (e.g., an initial data packet segment) may indicate (e.g., via a control channel) a reservation for retransmission resources for data packet segment 320-*a*. Additionally, the transmission of data packet segment 320-*a* may indicate (e.g., via the control channel) a reservation for transmission resources for subsequent data packet segments 320 (e.g., data packet segment 320-*b*) that correspond to the same original data packet. For example, UE 115 may create a first MAC PDU 315-*a* with an indication of a reservation indication for subsequent MAC PDUs 315 (e.g., MAC PDU 315-*b*) corresponding to the same RLC PDU 305-*a*. In some cases, each data packet segment 320 may also indicate (e.g., via a control channel or data channel) a reservation for resources for its own retransmission.

Figure 4:
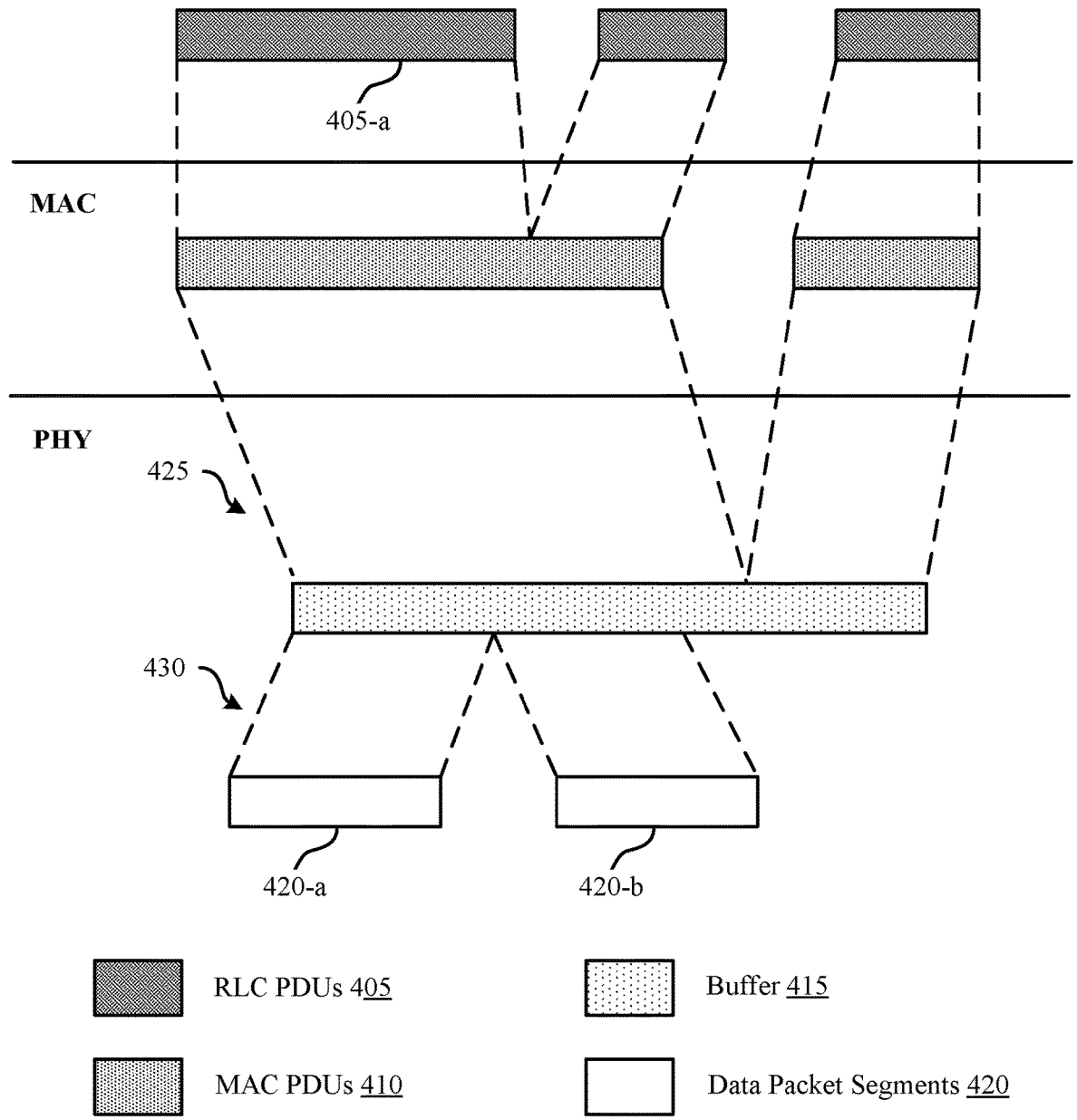

FIG. 4 illustrates an example of a segmentation process 400 that supports resource allocation and segmentation in wireless systems in accordance with aspects of the present disclosure. In some examples, segmentation process 400 may implement aspects of wireless communications systems 100 or 200. Segmentation process 400 may be implemented by a UE, such as a UE 115 described with reference to FIGS. 1-3.

As described herein with reference to FIG. 2, UE 115 may segment data packets in order to ensure that each data packet fits within one TTI. In some cases, UE 115 may determine that a data packet may not fit within one TTI and may therefore determine to segment the data packet.

In some examples of segmentation process 400, UE 115 may create segments from a data packet where each segment corresponds to a required number of coded bits (e.g., that may fit within a single TTI). For example, UE 115 may create the segments after encoding by encoding MAC PDUs 410 into a buffer 415. In some cases, UE 115 may read bits out of the buffer 415 into a transmission resource (e.g., data packet segment 420) based on available MAC PDU data and the size of the resource, after which UE 115 may transmit the resulting data packet segment 420. In some examples, UE 115 may implement this method one transmission resource at a time using reserved resources that may, in some cases, be discontinuous.

For example, UE 115 may create data packets for V2X transmissions and may prepare the data packets for transmission. As of the data preparation process, UE 115 may create RLC PDUs 405 corresponding to the data packets and may further create MAC PDUs 410 corresponding to RLC PDUs 405 (e.g., using corresponding MAC SDUs). In some cases, UE 115 may then encode MAC PDUs 410 into a buffer 415 using an encoding process 425. Following encoding process 425, UE 115 may read encoded bits out of buffer 415 and onto a reserved transmission resource (e.g., a data packet segment 420) as part of segmentation process 430. In some cases, the number of bits read onto the transmission resource may depend on the size of the resource (e.g., TTI) and/or depend on the number of bits stored in buffer 415. In some examples, UE 115 may read bits onto a reserved transmission resource one TTI at a time, and thus create a data packet segment 420 that may fit within one TTI. Additionally, UE 115 may read bits onto discontinuous resources, as described herein with reference to FIG. 2.

In some cases, the transmission of the data packet segment 420-a (e.g., an initial data packet segment) may indicate (e.g., via a control channel) a reservation for retransmission resources for data packet segment 420-a. Additionally, the transmission of data packet segment 420-a may indicate (e.g., via the control channel) a reservation for transmission resources for subsequent data packet segments 420 (e.g., data packet segment 420-b) that correspond to the same original data packet (e.g., same original RLC PDU 405-a). In some examples, each data packet segment 420 may indicate (e.g., via a control channel) a reservation for resources for its own retransmission.

Figure 5:
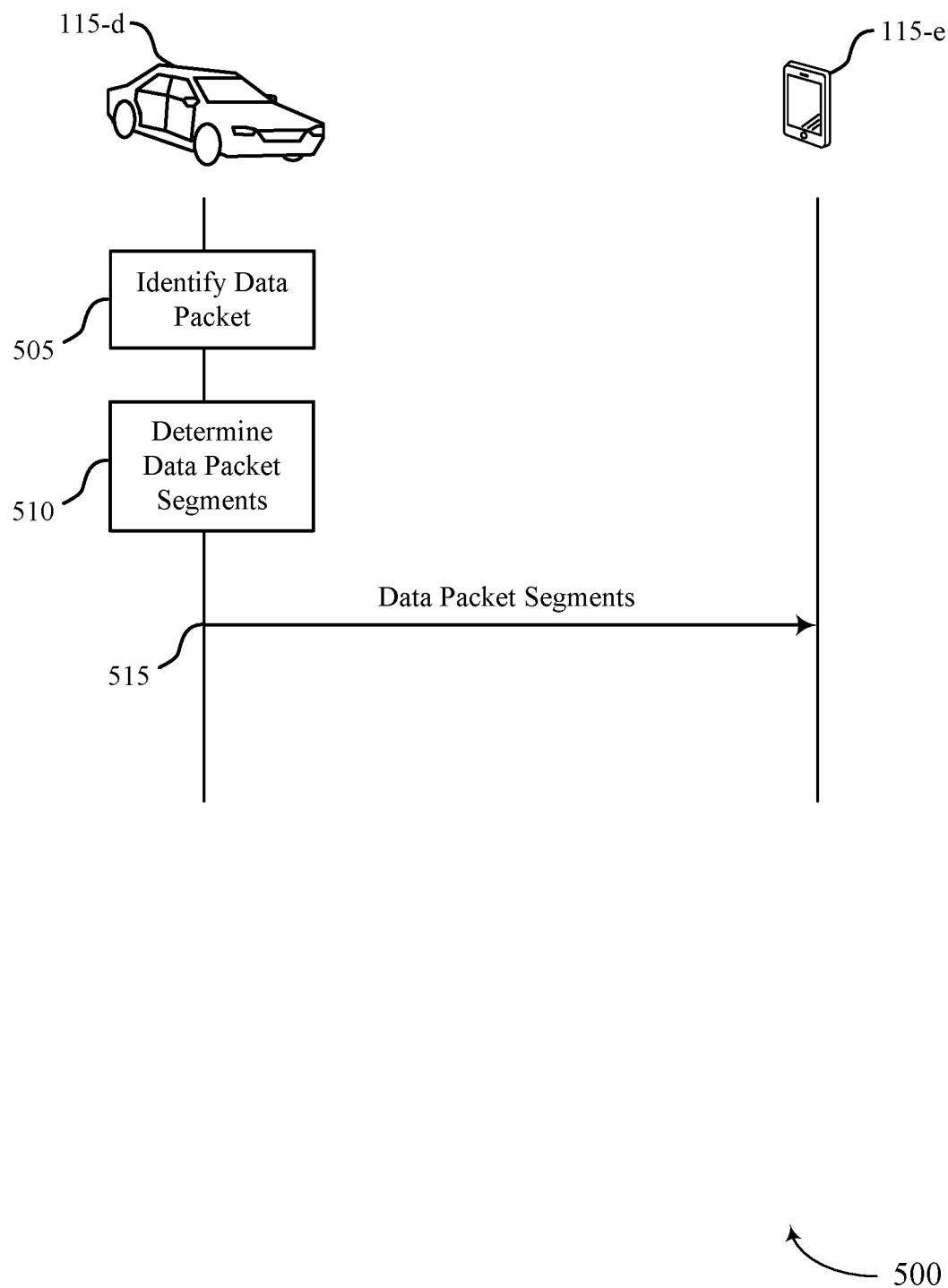
FIG. 5 illustrates an example of a process flow that supports resource allocation and segmentation in wireless systems in accordance with aspects of the present disclosure.

FIG. 5 illustrates an example of a process flow 500 that supports resource allocation and segmentation in wireless systems in accordance with aspects of the present disclosure. In some examples, process flow 500 may implement aspects of wireless communications systems 100 or 200. Additionally, process flow 500 may implement aspects of segmentation processes 300 or 400. Furthermore, process flow 500 may be implemented by a UE 115-d (e.g., a first wireless device) and a UE 115-e (e.g., a second wireless device) in a V2X system, which may be examples of UEs 115 described with reference to FIGS. 1-4.

In the following description of process flow 500, the operations between UE 115-d and UE 115-e may be transmitted in a different order than the order shown, or the operations performed by UE 115-d and UE 115-e may be performed in different orders or at different times. Certain operations may also be left out of process flow 500, or other operations may be added to process flow 500. It is to be understood that while UE 115-d and UE 115-e are shown performing a number of the operations of process flow 500, any wireless device may perform the operations shown.

At 505, a first wireless device (e.g., UE 115-d) in a V2X system may identify a data packet for transmission to at least one other wireless device (e.g., UE 115-e) in the V2X system.

At 510, UE 115-d may determine a set of data packet segments of the data packet, each data packet segment corresponding to a single TTI, for transmission to UE 115-e. In some cases, UE 115-d may determine that a size of the data packet exceeds a threshold size and determine the set of data packet segments based on determining that the size of the data packet exceeds the threshold size. In some examples, determining the set of data packet segments may include segmenting an RLC PDU into a set of MAC PDUs. Additionally or alternatively, UE 115-d may segment the data packet into a set of RLC PDUs and segment each of the set of RLC PDUs into respective sets of MAC PDUs. In some cases, one or more MAC PDUs subsequent to an initial MAC PDU of the set of MAC PDUs may include respective indications of reserved resources for corresponding one or more MAC PDUs.

In some cases, UE 115-d may segment the data packet into the set of data packet segments, where each of the set of data packet segments may correspond to a respective code block, and may encode the set of data packet segments after segmentation. Additionally or alternatively, UE 115-d may encode the data packet for transmission to UE 115-e, may identify a number of coded bits for the single TTI, and may segment the encoded data packet into the set of data packet segments based on the number of coded bits. In other cases, UE 115-d may encode a MAC PDU corresponding to the data packet into a buffer and may map encoded bits of the encoded MAC PDU from the buffer to resources associated with a respective TTI.

At 515, UE 115-d may transmit the set of data packet segments to UE 115-e via each TTI corresponding to the set of data packet segments, where a data packet segment transmission (e.g., an initial data packet segment transmission) may indicate resources for at least one of a retransmission of the data packet segment or subsequent data packet segment transmissions. In some examples, UE 115-d may transmit each data packet segment based on the mapping performed from the buffer. In some cases, each data packet segment transmission may indicate resources for retransmission of each respective data packet segment.

Figure 6:
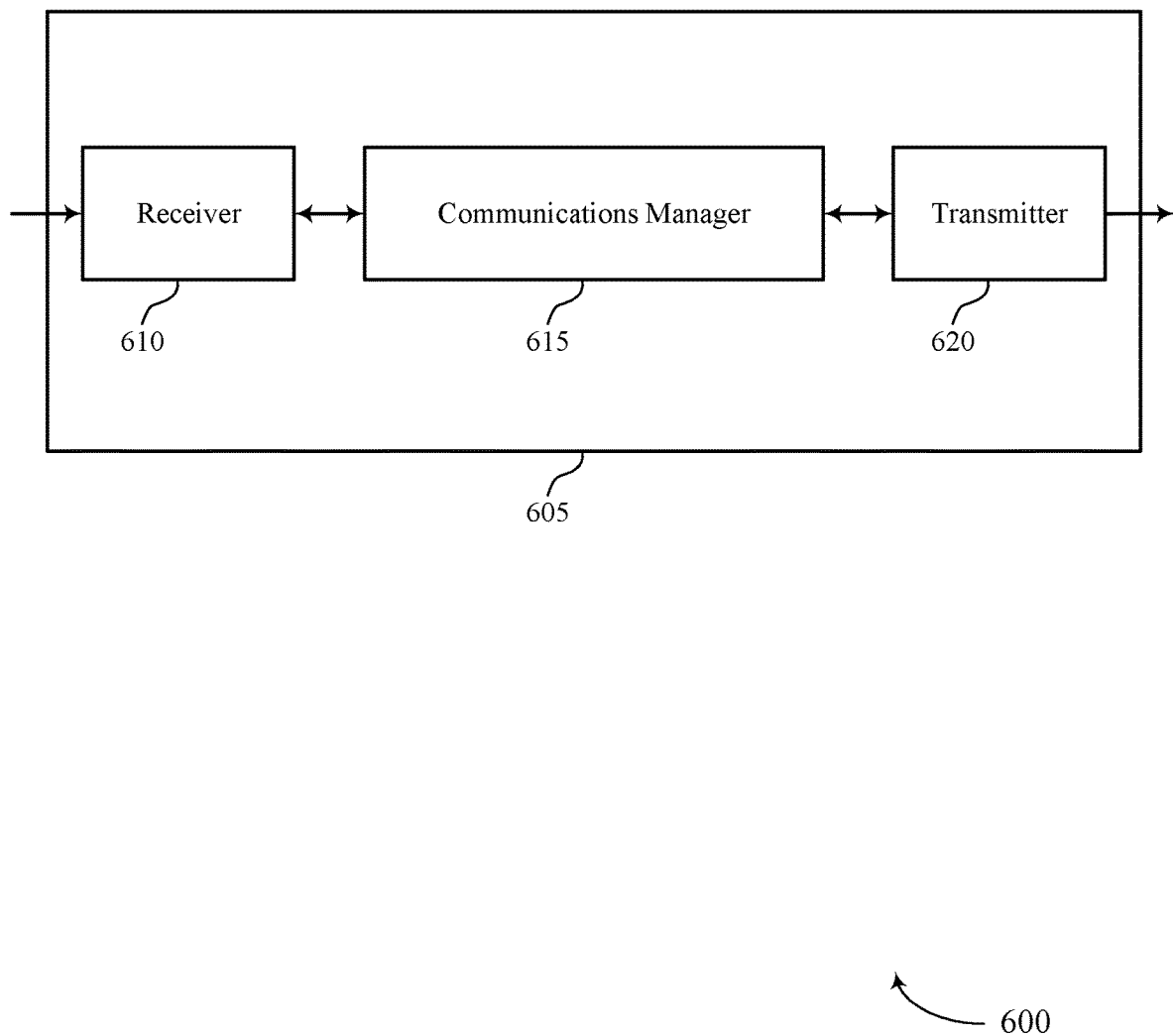
FIGS. 6 and 7 show block diagrams of devices that support resource allocation and segmentation in wireless systems in accordance with aspects of the present disclosure.

FIG. 6 shows a block diagram 600 of a device 605 that supports resource allocation and segmentation in wireless systems in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to resource allocation and segmentation in wireless systems, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine, by a first wireless device in a V2X system, a data packet for transmission to at least one other wireless device in the V2X system, determine a set of data packet segments of the data packet, each data packet segment corresponding to a single TTI for transmission to the at least one other wireless device, and transmit the set of data packet segments to the at least one other wireless device via each TTI corresponding to the set of data packet segments, where a data packet segment transmission (e.g., an initial data packet segment transmission) indicates resources for at least one of a retransmission of the data packet segment or subsequent data packet segment transmissions. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 as described herein may be implemented to realize one or more potential advantages. One implementation may enable the device 605 to segment a data packet into a number of data packet segments to more efficiently use candidate resources (e.g., candidate TTIs). By segmenting and transmitting a data packet in smaller segments, the device 605 may use a number of candidate resources that may not entirely fit the unsegmented data packet, reducing the latency associated with the data packet and therefore improving network efficiency.

This implementation may allow for greater transmission flexibility at the device 605 and, in some examples, may enable the device 605 to reduce the time the device 605 spends selecting a resource for the data packet (e.g., relative to a legacy device that may need to wait for a resource that can fit the entire data packet), reducing processing time which may result in increased power savings and increased battery life.

Figure 7:
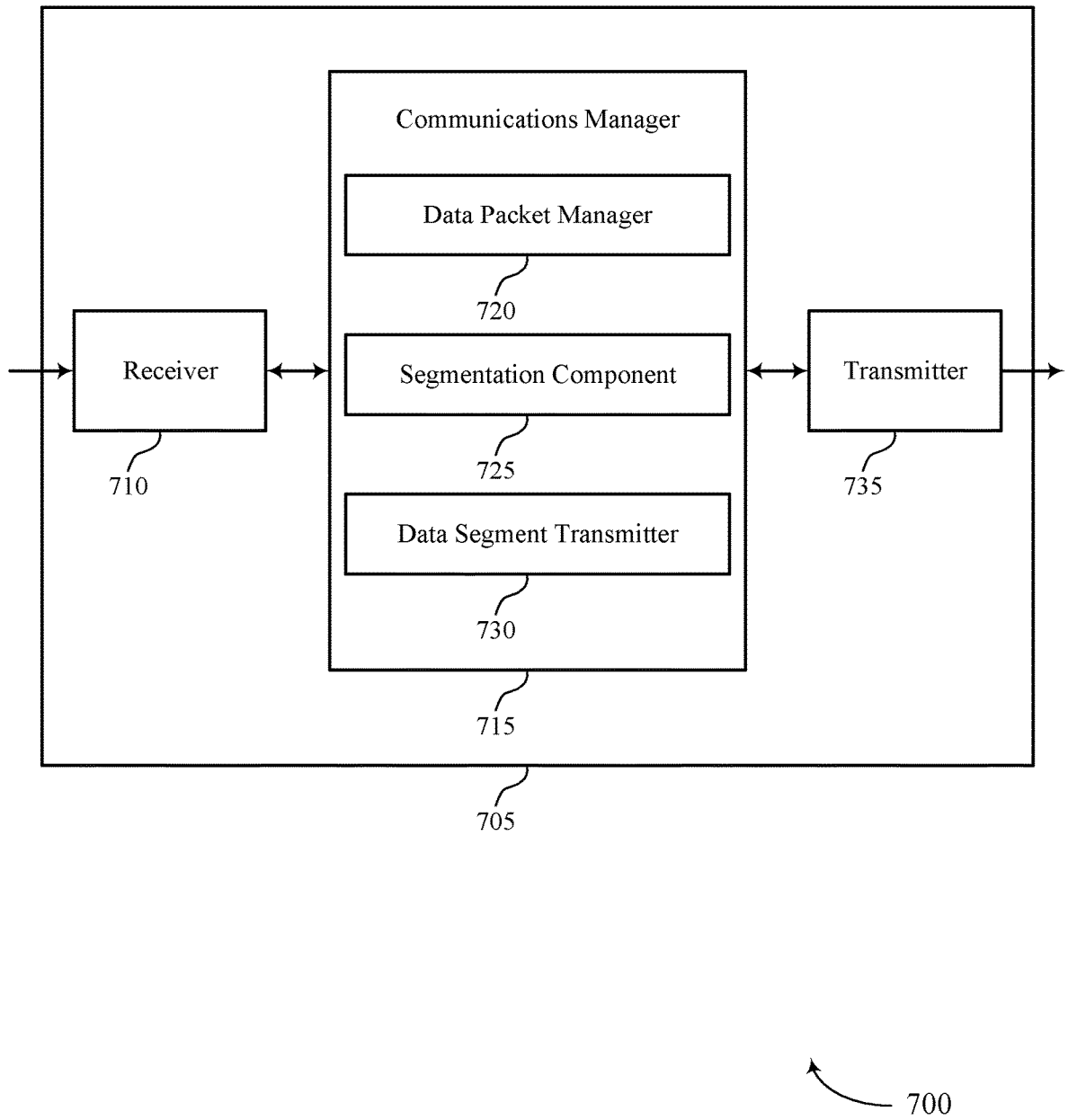

FIG. 7 shows a block diagram 700 of a device 705 that supports resource allocation and segmentation in wireless systems in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to resource allocation and segmentation in wireless systems, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a data packet manager 720, a segmentation component 725, and a data segment transmitter 730. The communications manager 715 may be an example of aspects of the communications manager 910 described herein.

The data packet manager 720 may determine, by a first wireless device in a V2X system, a data packet for transmission to at least one other wireless device in the V2X system.

The segmentation component 725 may determine a set of data packet segments of the data packet, each data packet segment corresponding to a single TTI for transmission to the at least one other wireless device.

The data segment transmitter 730 may transmit the set of data packet segments to the at least one other wireless device via each TTI corresponding to the set of data packet segments, where a data packet segment transmission indicates resources for at least one of a retransmission of the data packet segment or subsequent data packet segment transmissions.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
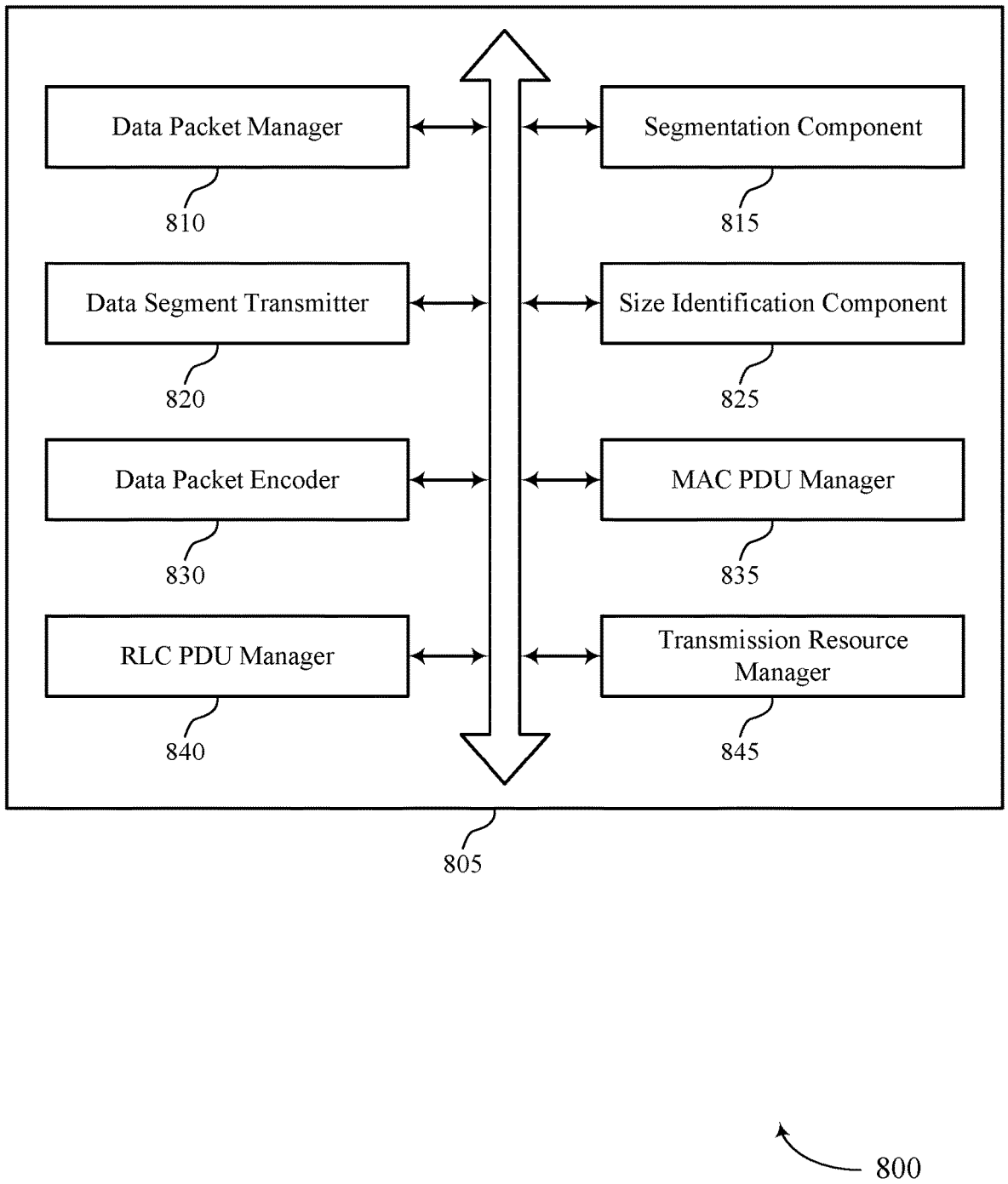
FIG. 8 shows a block diagram of a communications manager that supports resource allocation and segmentation in wireless systems in accordance with aspects of the present disclosure.

FIG. 8 shows a block diagram 800 of a communications manager 805 that supports resource allocation and segmentation in wireless systems in accordance with aspects of the present disclosure. The communications manager 805 may be an example of aspects of a communications manager 615, a communications manager 715, or a communications manager 910 described herein. The communications manager 805 may include a data packet manager 810, a segmentation component 815, a data segment transmitter 820, a size identification component 825, a data packet encoder 830, a MAC PDU manager 835, a RLC PDU manager 840, and a transmission resource manager 845. Each of these modules may communicate, directly or indirectly, with one another (e.g., via one or more buses).

The data packet manager 810 may determine, by a first wireless device in a V2X system, a data packet for transmission to at least one other wireless device in the V2X system.

The segmentation component 815 may determine a set of data packet segments of the data packet, each data packet segment corresponding to a single TTI for transmission to the at least one other wireless device. In some examples, the segmentation component 815 may determine the set of data packet segments based on determining that the size of the data packet exceeds the threshold size. In some cases, the segmentation component 815 may segment the data packet into the set of data packet segments, where each of the set of data packet segments corresponds to a respective code block. In some aspects, the segmentation component 815 may segment the encoded data packet into the set of data packet segments based on the number of coded bits.

The data segment transmitter 820 may transmit the set of data packet segments to the at least one other wireless device via each TTI corresponding to the set of data packet segments, where a data packet segment transmission indicates resources for at least one of a retransmission of the data packet segment or subsequent data packet segment transmissions. In some examples, the data segment transmitter 820 may transmit each data packet segment based on the mapping. In some cases, each data packet segment transmission indicates resources for retransmission of each respective data packet segment.

The size identification component 825 may determine that a size of the data packet exceeds a threshold size. In some examples, the size identification component 825 may identify a number of coded bits for the single TTI.

The data packet encoder 830 may encode the set of data packet segments after segmentation. In some examples, the data packet encoder 830 may encode the data packet for transmission to the at least one other wireless device. In some cases, the data packet encoder 830 may encode a MAC PDU corresponding to the data packet into a buffer.

The MAC PDU manager 835 may segment an RLC PDU into a set of MAC PDUs. In some examples, the MAC PDU manager 835 may segment each of the set of RLC PDUs into respective sets of MAC PDUs. In some cases, one or more MAC PDUs subsequent to an initial MAC PDU of the set of MAC PDUs include respective indications of reserved resources for corresponding one or more MAC PDUs.

The RLC PDU manager 840 may segment the data packet into a set of RLC PDUs.

The transmission resource manager 845 may map encoded bits of the encoded MAC PDU from the buffer to resources associated with a respective TTI.

Figure 9:
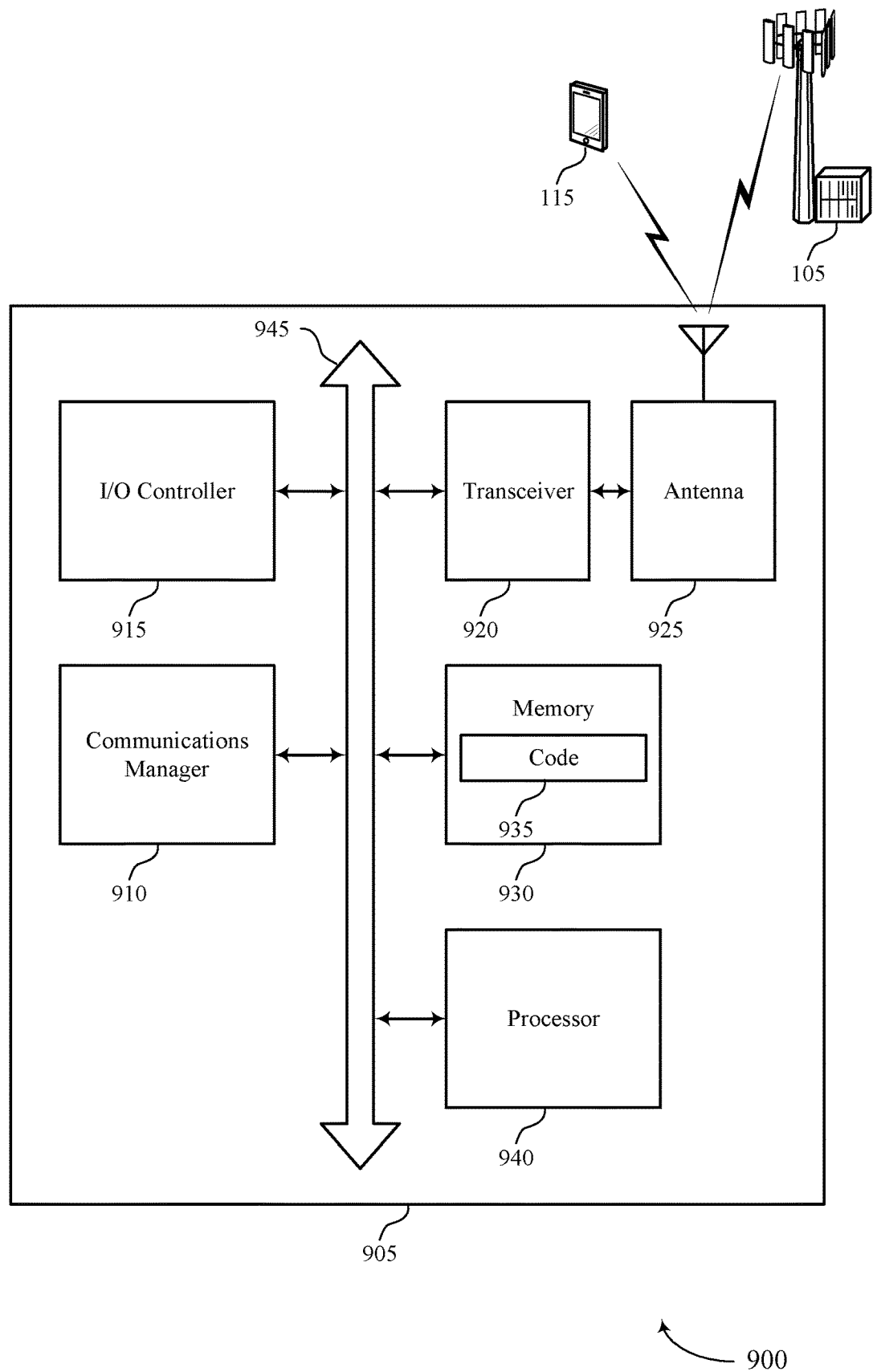
FIG. 9 shows a diagram of a system including a device that supports resource allocation and segmentation in wireless systems in accordance with aspects of the present disclosure.

FIG. 9 shows a diagram of a system 900 including a device 905 that supports resource allocation and segmentation in wireless systems in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine, by a first wireless device in a V2X system, a data packet for transmission to at least one other wireless device in the V2X system, determine a set of data packet segments of the data packet, each data packet segment corresponding to a single TTI for transmission to the at least one other wireless device, and transmit the set of data packet segments to the at least one other wireless device via each TTI corresponding to the set of data packet segments, where a data packet segment transmission indicates resources for at least one of a retransmission of the data packet segment or subsequent data packet segment transmissions.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting resource allocation and segmentation in wireless systems).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
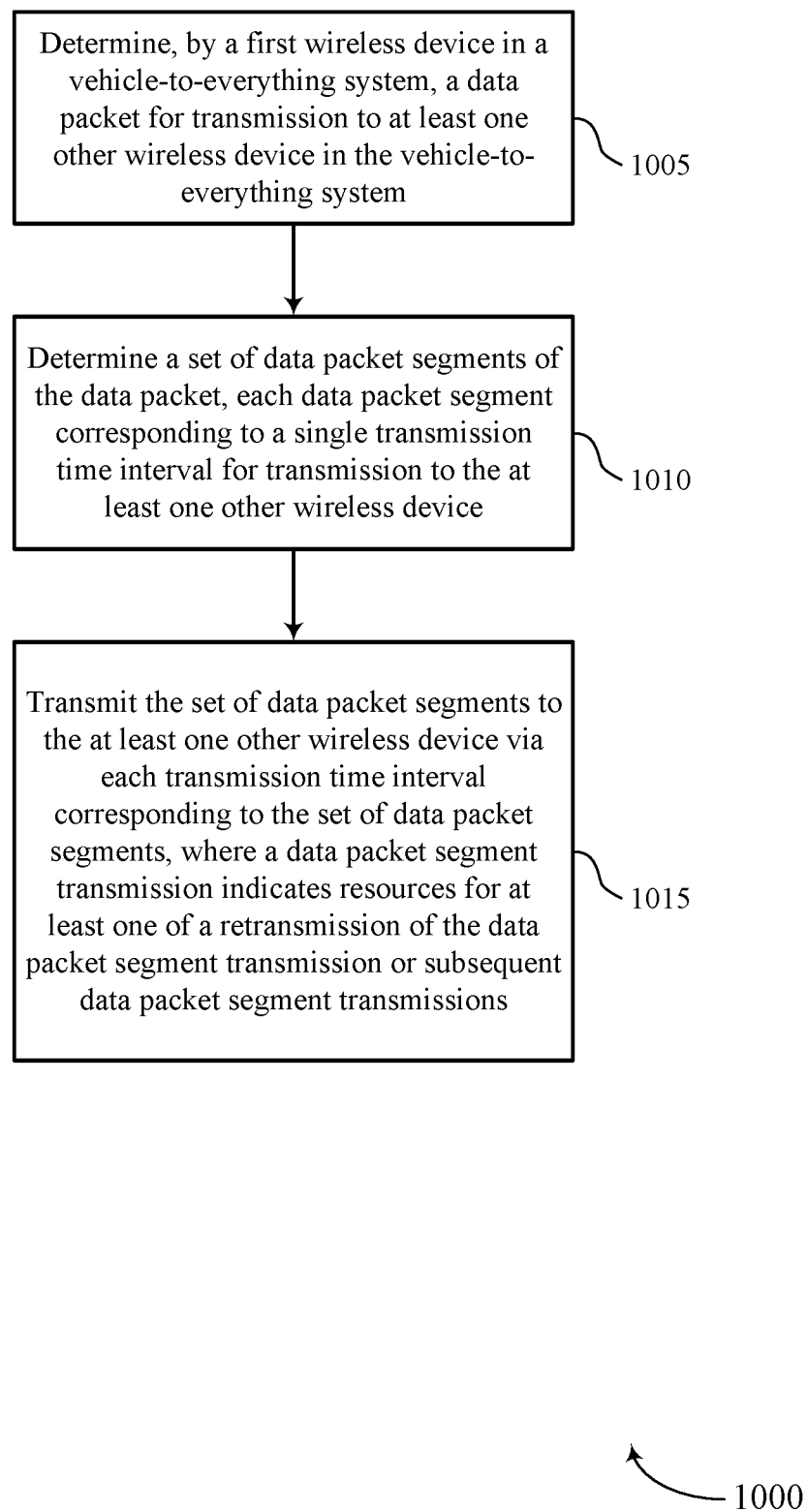
FIGS. 10 through 13 show flowcharts illustrating methods that support resource allocation and segmentation in wireless systems in accordance with aspects of the present disclosure.

FIG. 10 shows a flowchart illustrating a method 1000 that supports resource allocation and segmentation in wireless systems in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may determine, by a first wireless device in a V2X system, a data packet for transmission to at least one other wireless device in the V2X system. The operations of 1005 may be performed according to the methods described herein. In some examples, aspects of the operations of 1005 may be performed by a data packet manager as described with reference to FIGS. 6 through 9.

At 1010, the UE may determine a set of data packet segments of the data packet, each data packet segment corresponding to a single TTI for transmission to the at least one other wireless device. The operations of 1010 may be performed according to the methods described herein. In some examples, aspects of the operations of 1010 may be performed by a segmentation component as described with reference to FIGS. 6 through 9.

At 1015, the UE may transmit the set of data packet segments to the at least one other wireless device via each TTI corresponding to the set of data packet segments, where a data packet segment transmission indicates resources for at least one of a retransmission of the data packet segment or subsequent data packet segment transmissions. The operations of 1015 may be performed according to the methods described herein. In some examples, aspects of the operations of 1015 may be performed by a data segment transmitter as described with reference to FIGS. 6 through 9.

Figure 11:
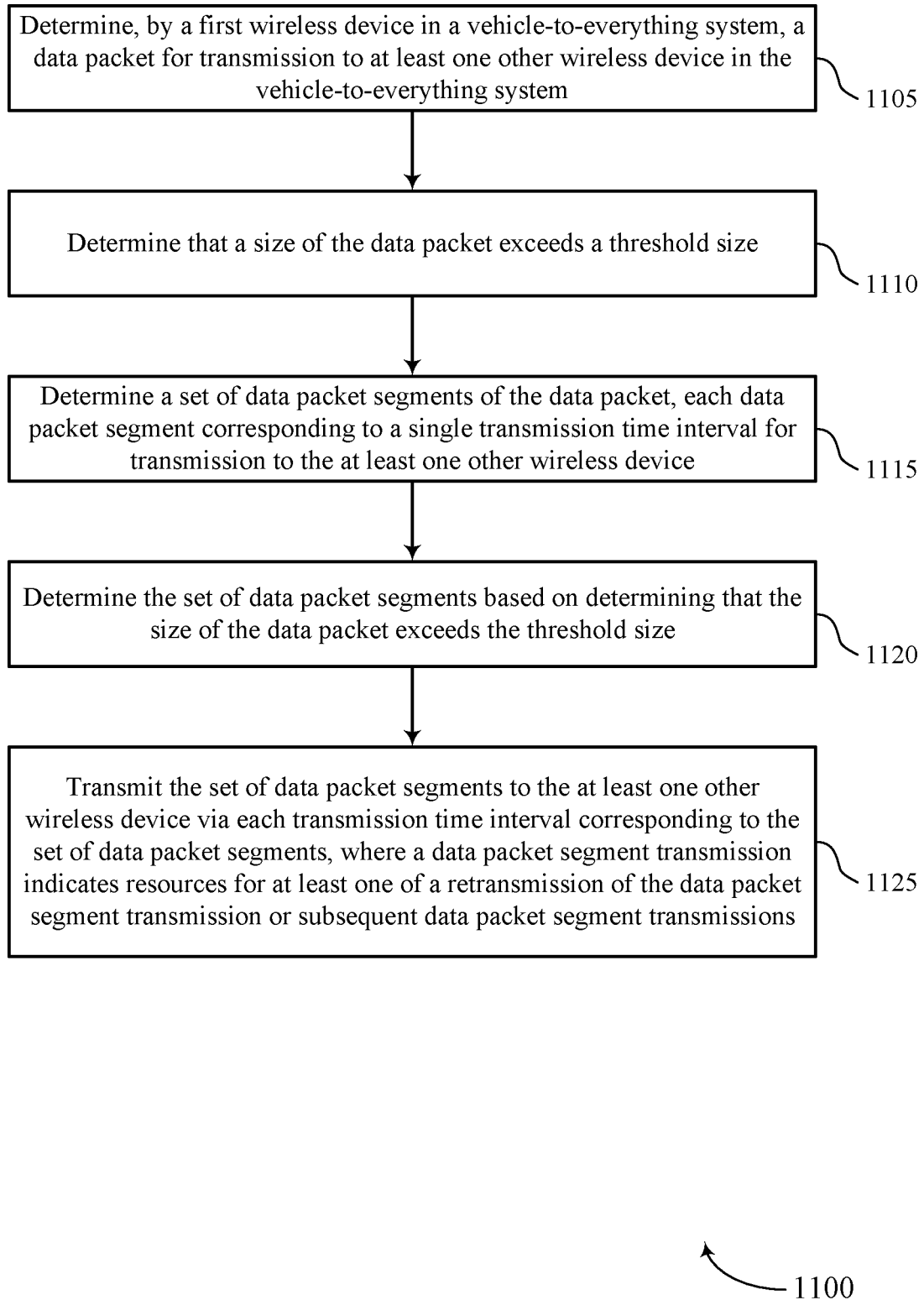

FIG. 11 shows a flowchart illustrating a method 1100 that supports resource allocation and segmentation in wireless systems in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may determine, by a first wireless device in a V2X system, a data packet for transmission to at least one other wireless device in the V2X system. The operations of 1105 may be performed according to the methods described herein. In some examples, aspects of the operations of 1105 may be performed by a data packet manager as described with reference to FIGS. 6 through 9.

At 1110, the UE may determine that a size of the data packet exceeds a threshold size. The operations of 1110 may be performed according to the methods described herein. In some examples, aspects of the operations of 1110 may be performed by a size identification component as described with reference to FIGS. 6 through 9.

At 1115, the UE may determine a set of data packet segments of the data packet, each data packet segment corresponding to a single TTI for transmission to the at least one other wireless device. The operations of 1115 may be performed according to the methods described herein. In some examples, aspects of the operations of 1115 may be performed by a segmentation component as described with reference to FIGS. 6 through 9.

At 1120, the UE may determine the set of data packet segments based on determining that the size of the data packet exceeds the threshold size. The operations of 1120 may be performed according to the methods described herein. In some examples, aspects of the operations of 1120 may be performed by a segmentation component as described with reference to FIGS. 6 through 9.

At 1125, the UE may transmit the set of data packet segments to the at least one other wireless device via each TTI corresponding to the set of data packet segments, where a data packet segment transmission indicates resources for at least one of a retransmission of the data packet segment or subsequent data packet segment transmissions. The operations of 1125 may be performed according to the methods described herein. In some examples, aspects of the operations of 1125 may be performed by a data segment transmitter as described with reference to FIGS. 6 through 9.

Figure 12:
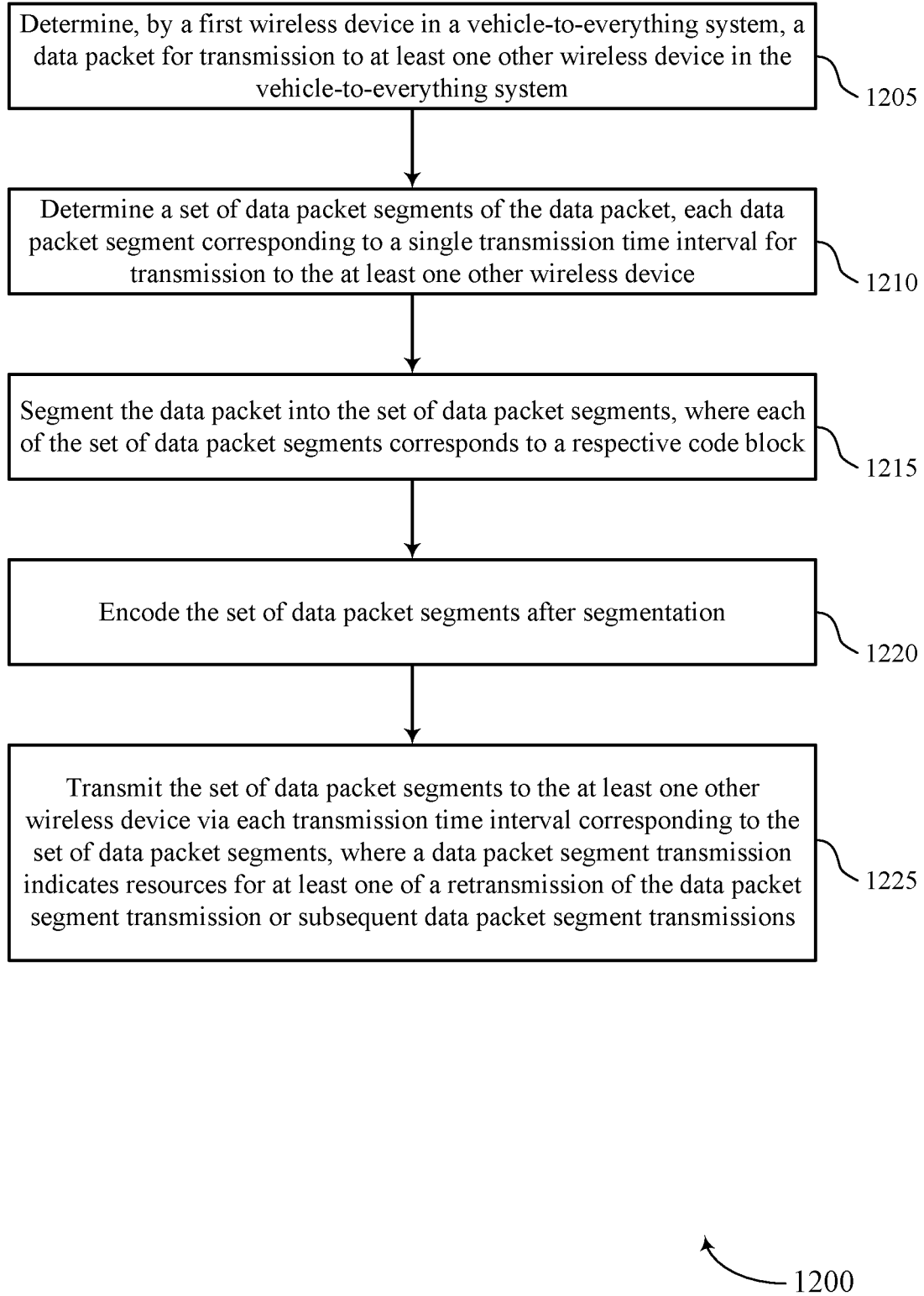

FIG. 12 shows a flowchart illustrating a method 1200 that supports resource allocation and segmentation in wireless systems in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may determine, by a first wireless device in a V2X system, a data packet for transmission to at least one other wireless device in the V2X system. The operations of 1205 may be performed according to the methods described herein. In some examples, aspects of the operations of 1205 may be performed by a data packet manager as described with reference to FIGS. 6 through 9.

At 1210, the UE may determine a set of data packet segments of the data packet, each data packet segment corresponding to a single TTI for transmission to the at least one other wireless device. The operations of 1210 may be performed according to the methods described herein. In some examples, aspects of the operations of 1210 may be performed by a segmentation component as described with reference to FIGS. 6 through 9.

At 1215, the UE may segment the data packet into the set of data packet segments, where each of the set of data packet segments corresponds to a respective code block. The operations of 1215 may be performed according to the methods described herein. In some examples, aspects of the operations of 1215 may be performed by a segmentation component as described with reference to FIGS. 6 through 9.

At 1220, the UE may encode the set of data packet segments after segmentation. The operations of 1220 may be performed according to the methods described herein. In some examples, aspects of the operations of 1220 may be performed by a data packet encoder as described with reference to FIGS. 6 through 9.

At 1225, the UE may transmit the set of data packet segments to the at least one other wireless device via each TTI corresponding to the set of data packet segments, where a data packet segment transmission indicates resources for at least one of a retransmission of the data packet segment or subsequent data packet segment transmissions. The operations of 1225 may be performed according to the methods described herein. In some examples, aspects of the operations of 1225 may be performed by a data segment transmitter as described with reference to FIGS. 6 through 9.

Figure 13:
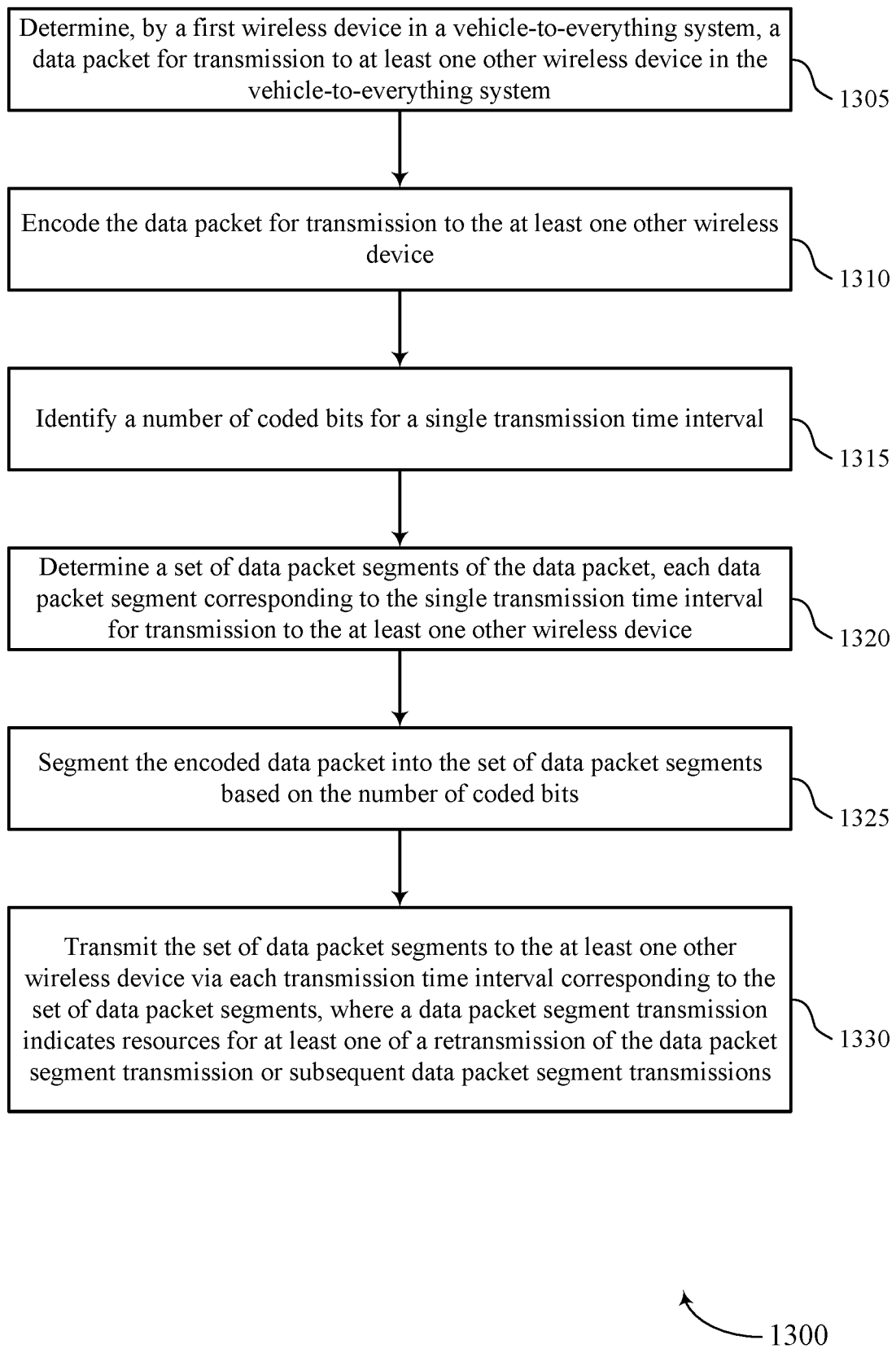

FIG. 13 shows a flowchart illustrating a method 1300 that supports resource allocation and segmentation in wireless systems in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may determine, by a first wireless device in a V2X system, a data packet for transmission to at least one other wireless device in the V2X system. The operations of 1305 may be performed according to the methods described herein. In some examples, aspects of the operations of 1305 may be performed by a data packet manager as described with reference to FIGS. 6 through 9.

At 1310, the UE may encode the data packet for transmission to the at least one other wireless device. The operations of 1310 may be performed according to the methods described herein. In some examples, aspects of the operations of 1310 may be performed by a data packet encoder as described with reference to FIGS. 6 through 9.

At 1315, the UE may identify a number of coded bits for the single TTI. The operations of 1315 may be performed according to the methods described herein. In some examples, aspects of the operations of 1315 may be performed by a size identification component as described with reference to FIGS. 6 through 9.

At 1320, the UE may determine a set of data packet segments of the data packet, each data packet segment corresponding to a single TTI for transmission to the at least one other wireless device. The operations of 1320 may be performed according to the methods described herein. In some examples, aspects of the operations of 1320 may be performed by a segmentation component as described with reference to FIGS. 6 through 9.

At 1325, the UE may segment the encoded data packet into the set of data packet segments based on the number of coded bits. The operations of 1325 may be performed according to the methods described herein. In some examples, aspects of the operations of 1325 may be performed by a segmentation component as described with reference to FIGS. 6 through 9.

At 1330, the UE may transmit the set of data packet segments to the at least one other wireless device via each TTI corresponding to the set of data packet segments, where a data packet segment transmission indicates resources for at least one of a retransmission of the data packet segment or subsequent data packet segment transmissions. The operations of 1330 may be performed according to the methods described herein. In some examples, aspects of the operations of 1330 may be performed by a data segment transmitter as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Example 1: A method of wireless communications comprising determining, by a first wireless device in a vehicle-to-everything system, a data packet for transmission to at least one other wireless device in the vehicle-to-everything system, determining a set of data packet segments of the data packet, each data packet segment corresponding to a single transmission time interval for transmission to the at least one other wireless device, and transmitting the set of data packet segments to the at least one other wireless device via each transmission time interval corresponding to the set of data packet segments, wherein a data packet segment transmission indicates resources for at least one of a retransmission of the data packet segment transmission or subsequent data packet segment transmissions.

Example 2: The method of example 1, further comprising: determining that a size of the data packet exceeds a threshold size and determining the set of data packet segments based on determining that the size of the data packet exceeds the threshold size.

Example 3: The method of any of examples 1 to 2, further comprising: segmenting the data packet into the set of data packet segments, where each of the set of data packet segments corresponds to a respective code block, and encoding the set of data packet segments after segmentation.

Example 4: The method of any of examples 1 to 3, wherein determining the set of data packet segments may include segmenting a RLC PDU into a set of MAC PDUs.

Example 5: The method of example 4, wherein one or more MAC PDUs subsequent to an initial MAC PDU of the set of MAC PDUs include respective indications of reserved resources for corresponding one or more MAC PDUs.

Example 6: The method of any of examples 1 to 5, wherein determining the set of data packet segments may include segmenting the data packet into a set of RLC PDUs, and segmenting each of the set of RLC PDUs into respective sets of MAC PDUs.

Example 7: The method of any of examples 1 to 6, further comprising: encoding the data packet for transmission to the at least one other wireless device, identifying a number of coded bits for the single TTI, and segmenting the encoded data packet into the set of data packet segments based on the number of coded bits.

Example 8: The method of any of examples 1 to 7, further comprising: encoding a MAC PDU corresponding to the data packet into a buffer, mapping encoded bits of the encoded MAC PDU from the buffer to resources associated with a respective TTI, and transmitting each data packet segment based on the mapping.

Example 9: The method of any of examples 1 to 8, wherein each data packet segment transmission indicates resources for retransmission of each respective data packet segment.

Example 10: An apparatus for wireless communications comprising a processor; memory in electronic communication with the processor; and instructions stored in the memory and executable by the processor to cause the apparatus to perform a method of any of examples 1 to 9.

Example 11: An apparatus comprising at least one means for performing a method of any of examples 1 to 9.

Example 12: A non-transitory computer-readable medium storing code for wireless communications, the code comprising instructions executable by a processor to perform a method of any of examples 1 to 9.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications, comprising:
one or more memories storing processor-executable code; and
one or more processors coupled with the one or more memories and operable to execute the code to cause the apparatus to:
segment a data packet into a set of data packet segments, each data packet segment corresponding to a different single transmission time interval for transmission to at least one other wireless device in a vehicle-to-everything system;
transmit a first data packet segment of the set of data packet segments, the first data packet segment comprising information indicating first time and frequency resources for retransmission of the first data packet segment or for transmission of a second data packet segment of the set of data packet segments, or both; and
transmit, via the first time and frequency resources, the second data packet segment of the set of data packet segments based at least in part on the first data packet segment comprising the information indicating the first time and frequency resources and whether negative acknowledgement feedback for the first data packet segment is processed, the second data packet segment indicating second time and frequency resources for retransmission of the second data packet segment.

2. The apparatus of claim 1, wherein segmenting the data packet into the set of data packet segments is based at least in part on a size of the data packet exceeding a threshold size.

3. The apparatus of claim 1, wherein the one or more processors are operable to execute the code to cause the apparatus to:
encode the data packet for the transmission to the at least one other wireless device, wherein segmenting the data packet comprises segmenting the encoded data packet into the set of data packet segments based at least in part on a number of coded bits for a single transmission time interval.

4. The apparatus of claim 1, wherein each of the set of data packet segments corresponds to a respective code block, and the one or more processors are operable to execute the code to cause the apparatus to:
encode the set of data packet segments after segmentation.

5. The apparatus of claim 1, wherein, to segment the data packet into the set of data packet segments, the one or more processors are operable to execute the code to cause the apparatus to:
segment a radio link control (RLC) protocol data unit (PDU) into a set of media access control (MAC) PDUs.

6. The apparatus of claim 5, wherein one or more MAC PDUs subsequent to an initial MAC PDU of the set of MAC PDUs include respective indications of reserved resources for corresponding one or more MAC PDUs.

7. The apparatus of claim 1, wherein, to segment the data packet into the set of data packet segments, the one or more processors are operable to execute the code to cause the apparatus to:
segment the data packet into a set of radio link control (RLC) protocol data units (PDUs); and
segment each of the set of RLC PDUs into respective sets of media access control (MAC) PDUs.

8. The apparatus of claim 1, wherein the one or more processors are operable to execute the code to cause the apparatus to:
encode a media access control (MAC) protocol data unit (PDU) corresponding to the data packet into a buffer;
map encoded bits of the encoded MAC PDU from the buffer to resources associated with a respective transmission time interval; and
transmit each data packet segment based at least in part on the mapping.

9. The apparatus of claim 1, wherein each data packet segment transmission indicates resources for retransmission of each respective data packet segment.

10. An apparatus for wireless communications, comprising:
one or more memories storing processor-executable code; and
one or more processors coupled with the one or more memories and operable to execute the code to cause the apparatus to:
segment a data packet into a set of data packet segments based at least in part on a size of the data packet exceeding a threshold size, each data packet segment corresponding to a different single transmission time interval for transmission to at least one other wireless device in a vehicle-to-everything system;
transmit a first data packet segment of the set of data packet segments, the first data packet segment comprising information indicating first time and frequency resources for retransmission of the first data packet segment or transmission of a second data packet segment of the set of data packet segments, or both; and
transmit, via the first time and frequency resources, the second data packet segment of the set of data packet segments based at least in part on the first data packet segment comprising the information indicating the first time and frequency resources and whether negative acknowledgement feedback for the first data packet segment is processed, the second data packet segment indicating second time and frequency resources for retransmission of the second data packet segment.

11. The apparatus of claim 10, wherein the one or more processors are operable to execute the code to cause the apparatus to:
encode the data packet for the transmission to the at least one other wireless device, wherein segmenting the data packet comprises segmenting the encoded data packet into the set of data packet segments based at least in part on a number of coded bits for a single transmission time interval.

12. The apparatus of claim 10, wherein each of the set of data packet segments corresponds to a respective code block, and the one or more processors are operable to execute the code to cause the apparatus to:
encode the set of data packet segments after segmentation.

13. The apparatus of claim 10, wherein, to segment the data packet into the set of data packet segments, the one or more processors are operable to execute the code to cause the apparatus to:
  segment a radio link control (RLC) protocol data unit (PDU) into a set of media access control (MAC) PDUs.

14. The apparatus of claim 13, wherein one or more MAC PDUs subsequent to an initial MAC PDU of the set of MAC PDUs include respective indications of reserved resources for corresponding one or more MAC PDUs.

15. The apparatus of claim 10, wherein, to segment the data packet into the set of data packet segments, the one or more processors are operable to execute the code to cause the apparatus to:
  segment the data packet into a set of radio link control (RLC) protocol data units (PDUs); and
  segment each of the set of RLC PDUs into respective sets of media access control (MAC) PDUs.

16. The apparatus of claim 10, wherein the one or more processors are operable to execute the code to cause the apparatus to:
  encode a media access control (MAC) protocol data unit (PDU) corresponding to the data packet into a buffer;
  map encoded bits of the encoded MAC PDU from the buffer to resources associated with a respective transmission time interval; and
  transmit each data packet segment based at least in part on the mapping.

17. The apparatus of claim 10, wherein each data packet segment transmission indicates resources for retransmission of each respective data packet segment.

18. An apparatus for wireless communications, comprising:
  one or more memories storing processor-executable code; and
  one or more processors coupled with the one or more memories and operable to execute the code to cause the apparatus to:
    encode a data packet for transmission to at least one other wireless device in a vehicle-to-everything system;
    segment the data packet into a set of data packet segments based at least in part on a number of coded bits for a single transmission time interval, each data packet segment corresponding to a different single transmission time interval;
    transmit a first data packet segment of the set of data packet segments, the first data packet segment comprising information indicating first time and frequency resources for retransmission of the first data packet segment or transmission of a second data packet segment of the set of data packet segments, or both; and
    transmit, via the first time and frequency resources, the second data packet segment of the set of data packet segments based at least in part on the first data packet segment comprising the information indicating the first time and frequency resources and whether negative acknowledgement feedback for the first data packet segment is processed, the second data packet segment indicating second time and frequency resources for retransmission of the second data packet segment.

19. The apparatus of claim 18, wherein segmenting the data packet into the set of data packet segments is based at least in part on a size of the data packet exceeding a threshold size.

20. The apparatus of claim 18, wherein each of the set of data packet segments corresponds to a respective code block, and the one or more processors are operable to execute the code to cause the apparatus to:
  encode the set of data packet segments after segmentation.

21. The apparatus of claim 18, wherein, to segment the data packet into the set of data packet segments, the one or more processors are operable to execute the code to cause the apparatus to:
  segment a radio link control (RLC) protocol data unit (PDU) into a set of media access control (MAC) PDUs.

22. The apparatus of claim 21, wherein one or more MAC PDUs subsequent to an initial MAC PDU of the set of MAC PDUs include respective indications of reserved resources for corresponding one or more MAC PDUs.

23. The apparatus of claim 18, wherein, to segment the data packet into the set of data packet segments, the one or more processors are operable to execute the code to cause the apparatus to:
  segment the data packet into a set of radio link control (RLC) protocol data units (PDUs); and
  segment each of the set of RLC PDUs into respective sets of media access control (MAC) PDUs.

24. The apparatus of claim 18, wherein the one or more processors are operable to execute the code to cause the apparatus to:
  encode a media access control (MAC) protocol data unit (PDU) corresponding to the data packet into a buffer;
  map encoded bits of the encoded MAC PDU from the buffer to resources associated with a respective transmission time interval; and
  transmit each data packet segment based at least in part on the mapping.

25. The apparatus of claim 18, wherein each data packet segment transmission indicates resources for retransmission of each respective data packet segment.

26. A method for wireless communications, comprising:
  segmenting a data packet into a set of data packet segments, each data packet segment corresponding to a different single transmission time interval for transmission to at least one other wireless device in a vehicle-to-everything system;
  transmitting a first data packet segment of the set of data packet segments, the first data packet segment comprising information indicating first time and frequency resources for retransmission of the first data packet segment or for transmission of a second data packet segment of the set of data packet segments, or both; and
  transmitting, via the first time and frequency resources, the second data packet segment of the set of data packet segments based at least in part on the first data packet segment comprising the information indicating the first time and frequency resources and whether negative acknowledgement feedback for the first data packet segment is processed, the second data packet segment indicating second time and frequency resources for retransmission of the second data packet segment.

27. The method of claim 26, wherein segmenting the data packet into the set of data packet segments is based at least in part on a size of the data packet exceeding a threshold size.

28. The method of claim 26, further comprising:
  encoding the data packet for the transmission to the at least one other wireless device, wherein segmenting the data packet comprises segmenting the encoded data packet into the set of data packet segments based at least in part on a number of coded bits for a single transmission time interval.

29. The method of claim 26, wherein each of the set of data packet segments corresponds to a respective code block, the method further comprising:
   encoding the set of data packet segments after segmentation.

30. The method of claim 26, wherein segmenting the data packet into the set of data packet segments comprises:
   segmenting a radio link control (RLC) protocol data unit (PDU) into a set of media access control (MAC) PDUs.

* * * * *